United States Patent
Shibata et al.

(10) Patent No.: US 8,696,516 B2
(45) Date of Patent: Apr. 15, 2014

(54) CONTROL DEVICE FOR VEHICULAR DRIVE SYSTEM

(75) Inventors: Hiroyuki Shibata, Susono (JP); Tooru Matsubara, Toyota (JP); Atsushi Tabata, Okazaki (JP); Masakazu Kaifuku, Okazaki (JP); Hidenori Kato, Nishio (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 987 days.

(21) Appl. No.: 12/449,769

(22) PCT Filed: Mar. 3, 2008

(86) PCT No.: PCT/JP2008/054223
§ 371 (c)(1),
(2), (4) Date: Sep. 24, 2009

(87) PCT Pub. No.: WO2008/111541
PCT Pub. Date: Sep. 18, 2008

(65) Prior Publication Data
US 2010/0022346 A1 Jan. 28, 2010

(30) Foreign Application Priority Data
Mar. 9, 2007 (JP) .................................. 2007-060478

(51) Int. Cl.
*B60W 10/00* (2006.01)
*B60W 10/06* (2006.01)
*B60W 10/08* (2006.01)

(52) U.S. Cl.
USPC .............................. 477/84; 477/107; 477/121

(58) Field of Classification Search
None
See application file for complete search history.

(56) References Cited

U.S. PATENT DOCUMENTS 5,072,631 A * 12/1991 Fujimoto et al. ............... 477/111
5,795,262 A *  8/1998 Robinson ......................... 477/92

(Continued)

FOREIGN PATENT DOCUMENTS

EP   1 116 620 A2   7/2001
EP   1 167 104 A2   1/2002

(Continued)

OTHER PUBLICATIONS

Japanese Office Action issued in Japanese Application No. 2007-060478; Mailed Dec. 1, 2009 (With Translation).

*Primary Examiner* — David D Le
*Assistant Examiner* — Steven B Christ
(74) *Attorney, Agent, or Firm* — Oliff PLC

(57) ABSTRACT

A control device for a vehicular drive system having (i) an engine, (ii) an electrically controlled differential portion operative to control an operating state of an electric motor connected to a rotary element of a differential mechanism for power-transmissive state for thereby controlling a differential state between a rotation speed of an input shaft connected to the engine, and a rotation speed of an output shaft, and (iii) a shifting portion forming a part of a power-transmitting mechanism between the electrically controlled differential portion and drive wheels, the control device including high-speed rotation preventing means for preventing high-speed rotations of each rotary elements of both the differential mechanism and the shifting portion, when a drop occurs or drop occurrence is predicted, in a supplied hydraulic pressure applied to a hydraulically operated frictional engaging device of the shifting portion, to a level less than a given value, wherein the high-speed rotation preventing means reduces torque or rotation speed of an input shaft of the shifting portion by controlling the engine or the electric motor.

9 Claims, 9 Drawing Sheets

(56) References Cited

U.S. PATENT DOCUMENTS

| | | | |
|---|---|---|---|
| 5,873,426 A | 2/1999 | Tabata et al. | |
| 5,921,885 A * | 7/1999 | Tabata et al. | 477/107 |
| 5,957,800 A * | 9/1999 | Oba et al. | 475/119 |
| 6,319,170 B1 * | 11/2001 | Hubbard et al. | 477/107 |
| 6,468,182 B1 * | 10/2002 | Brandt et al. | 477/98 |
| 6,478,713 B1 * | 11/2002 | Runde et al. | 477/107 |
| 6,500,089 B2 * | 12/2002 | Lasson et al. | 477/3 |
| 6,511,399 B2 * | 1/2003 | Mc Collum Etchason et al. | 477/107 |
| 6,616,569 B2 * | 9/2003 | Hoang et al. | 477/3 |
| 6,634,984 B1 * | 10/2003 | Doering et al. | 477/107 |
| 7,137,924 B2 | 11/2006 | Ito et al. | |
| 7,212,898 B2 * | 5/2007 | Whitton et | 701/51 |
| 7,223,201 B2 * | 5/2007 | Colvin et al. | 477/5 |
| 2002/0173391 A1 * | 11/2002 | Endo et al. | 474/18 |
| 2002/0179348 A1 * | 12/2002 | Tamai et al. | 180/65.2 |
| 2005/0170929 A1 | 8/2005 | Ito et al. | |
| 2005/0209760 A1 * | 9/2005 | Tabata et al. | 701/53 |
| 2005/0245350 A1 * | 11/2005 | Tabata et al. | 477/34 |
| 2006/0089775 A1 * | 4/2006 | Whitton et al. | 701/51 |
| 2006/0178244 A1 * | 8/2006 | Whitton et al. | 477/181 |
| 2008/0009391 A1 * | 1/2008 | Scelers | 477/107 |
| 2008/0153651 A1 * | 6/2008 | Matsubara et al. | 475/151 |
| 2009/0118936 A1 * | 5/2009 | Heap et al. | 701/54 |
| 2009/0305832 A1 * | 12/2009 | Matsubara et al. | 475/150 |
| 2010/0069196 A1 * | 3/2010 | Shibata et al. | 477/3 |
| 2011/0195817 A1 * | 8/2011 | Whitney et al. | 477/121 |

FOREIGN PATENT DOCUMENTS

| | | |
|---|---|---|
| JP | A-62-177343 | 8/1987 |
| JP | A-01-269620 | 10/1989 |
| JP | B2-3044885 | 3/2000 |
| JP | A-2005-9590 | 1/2005 |
| JP | A-2005-207305 | 8/2005 |
| JP | A-2005-319894 | 11/2005 |

* cited by examiner

|  | C1 | C2 | B1 | B2 | B3 | SPEED RATIO | STEPPING RATIO |
|---|---|---|---|---|---|---|---|
| 1st | ○ |  |  |  | ○ | 3.357 | 1.54 |
| 2nd | ○ |  |  | ○ |  | 2.180 | 1.53 |
| 3rd | ○ |  | ○ |  |  | 1.424 | 1.42 |
| 4th | ○ | ○ |  |  |  | 1.000 | SPREAD 3.36 |
| R |  | ○ |  |  | ○ | 3.209 | |
| N |  |  |  |  |  |  | |

○ ENGAGED

FIG.10

| SMALL LOW-PRESSURE LEVEL | INTERMEDIATE LOW-PRESSURE LEVEL | LARGE LOW-PRESSURE LEVEL |
|---|---|---|
| EXECUTE ELECTRIC MOTOR CONTROL | EXECUTE ENGINE CONTROL | EXECUTE ELECTRIC MOTOR CONTROL EXECUTE ENGINE CONTROL |

CONTROL DEVICE FOR VEHICULAR DRIVE SYSTEM

BACKGROUND OF THE INVENTION

1. Field of the Invention

This invention relates to a control device for a vehicular drive system. The vehicular drive system has an engine, an electrically controlled differential portion and a shifting portion. In the electrically controlled differential portion, with an operating state of an electric motor connected to a rotary element of a differential mechanism for power-transmissive state controlled, a differential state between a rotation speed of an input shaft connected to the engine and a rotation speed of an output shaft is controlled. The shifting portion forms a part of a power-transmitting path between the electrically controlled differential portion and drive wheels. The present invention particularly relates to a technology of a control device for preventing a high-speed rotation of a rotary element of the shifting portion of the differential mechanism.

2. Description of the Related Art

In general, a step-variable type automatic shifting portion is arranged to incorporate therein hydraulically operated frictional engaging devices such as clutches and brakes. Upon appropriately engaging or disengaging these hydraulically operated frictional engaging device, a gear position is established depending on a running state of a vehicle. In addition, a belt-drive type continuously variable shifting portion incorporates therein, for instance, a hydraulic cylinder, disposed inside a pulley, operates to vary a pulley width of the pulley, i.e., a pitch diameter of a steel belt wound on the pulley. This allows the gear position to be controlled at a desired speed ratio, while controlling a clamping force of the steel belt at an appropriate level not to cause a slippage. These hydraulically operated frictional engaging devices and hydraulic cylinder are operated with a supplied hydraulic pressure supplied to the respective devices as a drive source.

In the automatic shifting portion, if a drop occurs in the supplied hydraulic pressure due to some failures in the devices, a drop occurs in torque capacities of the hydraulically operated frictional engaging devices of the automatic shifting portion with a resultant occurrence of slippages. This results in a fear of deterioration occurring in durability of the hydraulically operated frictional engaging devices. In addition, even with the belt-drive type continuously variable shifting portion, if a drop occurs in the supplied hydraulic pressure of the hydraulic cylinder, the clamping force of, for instance, the steel belt decreases, causing a degradation occurring in durability of the steel belt and pulley.

On the contrary, in a shifting controlling device disclosed in Patent Publication 1 (Japanese Patent No. 3044885), a drop occurs in hydraulically operated frictional engaging devices such as clutches or the like, and if shortage of a transfer torque capacity is determined, torque of an engine is decreased. This results in a reduction in torque acting on the hydraulically operated frictional engaging devices, thereby preventing a slippage in excess to minimize deterioration in durability. Further, with a belt-drive type continuously variable transmission disclosed in Patent Publication 2 (Japanese Patent Application Publication No. 1-269620A), an output of an engine is reduced in presence of a failure in hydraulically operated frictional engaging devices of a continuously variable shifting portion. This causes a drop to occur in output to be transferred to a pulley and steel belt to minimize a slippage of the steel belt, thereby preventing degradations of the steel belt and pulley.

The vehicular drive system has one type which includes an engine, an electrically controlled differential portion and a shifting portion forming a part of a power-transmitting path between the electrically controlled differential portion and drive wheels. In the electrically controlled differential portion, with an operating state of an electric motor, connected to a rotary element of a differential mechanism for power-transmissive state controlled, a differential state in rotation speed of an input shaft connected to the engine, and a rotation speed of an output shaft is controlled. Upon selectively engaging hydraulically operated frictional engaging devices such as clutches and brakes or the like, the shifting portion is caused to shift in a proper gear position depending on a running state of a vehicle.

If a drop occurs in the supplied hydraulic pressure (clutch engaging pressure) supplied to the hydraulically operated frictional engaging devices relevant to the shifting operations of the shifting portion due to some failures, a drop occurs in transfer torque capacities of the hydraulically operated frictional engaging devices of the shifting portion, causing the slippage to occur. Then, the rotary elements of the electrically controlled differential portion and the shifting portion increase in high-speed rotations. This results in a fear of deterioration occurring in durability of the rotary elements of the electrically controlled differential portion and the shifting portion.

Further, the drive system incorporates therein an electrically controlled differential portion which is not provided in Patent Publications 1 and 2. Therefore, as the rotary element of the electrically controlled differential portion is subjected to the high-speed rotation, an electric motor connected to such a rotary element, is similarly caused to increase in high-speed rotation, causing a fear of degradation occurring in durability of the electric motor.

SUMMARY OF THE INVENTION

The present invention has been completed on the ground of the above views and has an object to provide, for a vehicular drive system having an engine, an electrically controlled differential portion and a shifting portion, a control device which can rapidly and effectively prevent high-speed rotations of rotary elements of both the shifting portion and the electrically controlled differential portion, when a drop occurs in a supplied hydraulic pressure (clutch engaging pressure). The hydraulic pressure is supplied to hydraulically operation frictional engaging devices of the shifting portion due to some failures. In the electrically controlled differential portion, by controlling an operating state of an electric motor connected to rotary elements of a differential mechanism for power-transmitting capability, a differential state between a rotation speed of an input shaft connected to the engine, and a rotation speed of an output shaft is controlled. The shifting portion forms a part of a power-transmitting path between the electrically controlled differential portion and drive wheels.

For achieving the above object, in a first aspect of the present invention is featured by that, a control device for (a) a vehicular drive system having (i) an engine, (ii) an electrically controlled differential portion operative to control an operating state of an electric motor connected to rotary elements of a differential mechanism for power-transmissive state for thereby controlling a differential state between a rotation speed of an input shaft connected to the engine, and a rotation speed of an output shaft, and (iii) a shifting portion forming a part of a power-transmitting mechanism between the electrically controlled differential portion and drive wheels, (b) the control device comprising high-speed rotation preventing means or high-rotation preventing portion for preventing high-speed rotations of each of rotary elements of both the differential mechanism and the shifting portion, when a drop occurs or drop occurrence is predicted in a supplied hydraulic pressure applied to a hydraulically operated frictional engaging device of the shifting portion, to a level less than a given value.

A second aspect of the present invention is featured by, in a control device for a vehicular drive system of the first aspect, that the high-speed rotation preventing means includes first high-speed rotation preventing means or a first high-rotation preventing portion associated with an engine control for preventing the high-speed rotations of the rotary elements of the differential mechanism and the shifting portion by controlling the engine.

A third aspect of the present invention is featured by, in a control device for a vehicular drive system of the first or second aspect, that the high-speed rotation preventing means includes second high-speed rotation preventing means or a second high-rotation preventing portion associated with an electric motor control for preventing the high-speed rotations of the rotary elements of the differential mechanism and the shifting portion by controlling the electric motor.

A fourth aspect of the present invention is featured by, in a control device for a vehicular drive system of the first, second or third aspect, that the first high-speed rotation preventing means or the second high-speed rotation preventing means is effectuated at a speed greater than a given vehicle speed.

A fifth aspect of the present invention is featured by, in a control device for a vehicular drive system of the second or fourth aspect, that the first high-speed rotation preventing means, associated with the engine control, is effectuated upon executing a fuel cut-off operation of the engine, a throttle opening limiting operation or a cylinder resting operation.

A sixth aspect of the present invention is featured by, in a control device for a vehicular drive system of the third or fourth aspect, that the second high-speed rotation preventing means, associated with the electric motor control, is effectuated upon executing a torque control of the electric motor.

A seventh aspect of the present invention is featured by, in a control device for a vehicular drive system of any one of the third to sixth aspects, that the high-speed rotation preventing means, associated with the engine control and the electric motor control, respectively, are effectuated depending on a level of the drop in the supplied hydraulic pressure applied to the hydraulically operation frictional engaging device.

A eighth aspect of the present invention is featured by, in a control device for a vehicular drive system of any one of the first to seventh aspects, that during effectuating the first high-speed rotation preventing means and the second high-speed rotation preventing means, a shifting of the shifting portion is interrupted or limited to fall in a specified shifting range.

A ninth aspect of the present invention is featured by, in a control device for a vehicular drive system of any one of the first to eighth aspects, that the drop in the supplied hydraulic pressure applied to the hydraulically operation frictional engaging device, is determined in response to a signal delivered from a hydraulic pressure sensor disposed in the shifting portion, a differential rotation speed of the hydraulically operation frictional engaging device or a failure determining signal delivered from a hydraulic pressure source.

A tenth aspect of the present invention is featured by, in a control device for a vehicular drive system of any of the first to ninth aspects, that the high-speed rotation preventing means is effectuated during a drive mode of the vehicle.

A eleventh aspect of the present invention is featured by, in a control device for a vehicular drive system of any one of the first to ninth aspects, the electrically controlled differential portion is rendered operative to operate as a continuously variable transmission mechanism with the operating state of the electric motor being controlled.

A twelfth aspect of the present invention is featured by, in a control device for a vehicular drive system of any one of the first to eleventh aspects, that the shifting portion includes a step-variable type automatic transmission.

According to the control device for a vehicular drive system of the first aspect, the high-speed rotation preventing means prevents the high-speed rotations of each of rotary elements of both the differential mechanism and the shifting portion, when the drop occurs or the drop occurrence is predicted in the supplied hydraulic pressure applied to the hydraulically operated frictional engaging device of the shifting portion, to the level less than a given value. This prevents degradation in durability of the rotary elements of both the differential mechanism and the shifting portion, and durability of the electric motor connected to the differential mechanism.

According to the control device for a vehicular drive system of the second aspect, the high-speed rotation preventing means includes first high-speed rotation preventing means associated with an engine control. Therefore, performing the engine control prevents the high-speed rotations of the rotary elements of both the differential mechanism and the shifting portion. This avoids degradation in durability of the rotary elements of the differential mechanism and shifting portion, and durability of the electric motor connected to the differential mechanism.

According to the control device for a vehicular drive system of the third aspect, the high-speed rotation preventing means includes second high-speed rotation preventing means associated with an electric motor control. Therefore, performing the electric motor prevents the high-speed rotations of the rotary elements of both the differential mechanism and the shifting portion. This avoids degradation in durability of the rotary elements of both the differential mechanism and the shifting portion, and durability of the electric motor connected to the differential mechanism.

According to the control device for a vehicular drive system of the fourth aspect, the high-speed rotation preventing means is effectuated at the speed greater than the given vehicle speed. In the low vehicle speed region, therefore, even if the supplied hydraulic pressure supplied to the hydraulically operation frictional engaging device of the shifting portion decreases to the level less than the given value, the rotary elements of both the differential mechanism and shifting portion have low likelihoods of reaching the high-speed rotations, and no high-speed rotation preventing operation is effectuated. This allows the high-speed rotation preventing means to be effectively implemented.

According to the control device for a vehicular drive system of the fifth aspect, the first high-speed rotation preventing means, associated with the engine control, is effectuated upon executing the fuel cut-off operation of the engine, the throttle opening limiting operation or the cylinder resting operation. This enables the engine to easily output the reduced torque.

According to the control device for a vehicular drive system of the sixth aspect, the second high-speed rotation preventing means, associated with the electric motor control, is effectuated upon executing the torque control of the electric motor. This enables torque to be controlled more rapidly than that controlled with the high-speed rotation preventing means by the engine control.

According to the control device for a vehicular drive system of the seventh aspect, either one of or both of the first high-speed rotation preventing means and the second high-speed rotation preventing means, associated with the engine control and the electric motor control, respectively, are effectuated depending on the level of the drop in the supplied hydraulic pressure applied to the hydraulically operation frictional engaging device. The high-speed rotation preventing means can be effectively applied to perform both the engine control and electric motor control.

That is, if the drop in the supplied hydraulic pressure lies at a relatively small level, only the high-speed rotation preventing means by the electric motor control, is effectuated to perform the torque control of the electric motor. In contrast, if the drop in the supplied hydraulic pressure lies at a remarkably high level, both the high-speed rotation preventing means by both the engine control and the electric motor control, are effectuated to perform both the engine control and the electric motor control.

According to the control device for a vehicular drive system of the eighth aspect, during effectuating the high-speed rotation preventing means, the shifting of the shifting portion is inhibited or limited to fall in the specified shifting range. This prevents the high-speed rotations of the rotary elements of both the differential mechanism and the shifting portion. In particular, there is a high risk of the high-speed rotations occurring in the rotary elements of the differential mechanism during a downshift, which is preferably inhibited. In contrast, the rotary elements of the differential mechanism generally have lowered rotation speeds, which is not serious as long as the shifting is permitted in a specified range.

According to the control device for a vehicular drive system of the ninth aspect, the drop in the supplied hydraulic pressure applied to the hydraulically operation frictional engaging device, is determined in response to the signal delivered from a hydraulic pressure sensor disposed in the shifting portion, the differential rotation speed of the hydraulically operation frictional engaging device or a failure determining signal delivered from a hydraulic pressure source. Therefore, the drop in the supplied hydraulic pressure or the prediction of such a drop can be easily detected.

According to the control device for a vehicular drive system of the tenth aspect, the high-speed rotation preventing means is effectuated during the drive mode of the vehicle. Therefore, during a non-drive mode like the coast running of the vehicle, none of the high-speed rotation preventing means is effectuated. During the non-drive mode of the vehicle, the rotations are input from the drive wheels. Thus, no risk occurs for the occurrence of high-speed rotations of the rotary elements of both the differential mechanism and the shifting portion, and no high-speed rotation preventing means is effectuated. Thus, effectuating no high-speed rotation preventing means during the non-drive mode of the vehicle performs the effective control.

According to the control device for a vehicular drive system of the eleventh aspect, the electrically controlled differential portion is rendered operative to operate as a continuously variable transmission mechanism with the operating state of the electric motor being controlled. This enables drive torque to be smoothly varied. The electrically controlled differential portion executes the operations not only to continuously vary the speed ratio to be operative as the electrically controlled continuously variable transmission but also to stepwise vary the speed ratio to be operative as the step-variable transmission. This enables the overall speed ratio of the vehicular drive system to vary step-by-step, enabling drive torque to be rapidly obtained.

According to the control device for a vehicular drive system of the twelfth aspect, the shifting portion includes a step-variable type automatic transmission. This enables drive torque to be smoothly varied. In addition, under a condition where the electrically controlled differential portion is controlled to establish a fixed speed ratio, the electrically controlled differential portion and the step-variable type automatic transmission provide a structure equivalent to the step-variable transmission. This allows the overall speed ratio of the vehicular drive system to vary step-by-step, enabling drive torque to be rapidly obtained.

More preferably, the differential mechanism includes a planetary gear set comprised of a first element connected to the engine, a second element connected to the first electric motor, and a third element connected to the output shaft. The first element includes a carrier of the planetary gear set, the second element includes a sun gear of the planetary gear set, and the third element includes a ring gear of the planetary gear set. With such a structure, the differential mechanism has a minimized axial dimension, and can be simply structured with a single planetary gear set.

More preferably, the planetary gear set includes a single pinion type planetary gear set. With such a structure, the differential mechanism has a minimized axial dimension, and can be simply structured with the single pinion type planetary gear set.

More preferably, the vehicular drive system has the overall speed ratio which is established based on a speed ratio (gear ratio) of the shifting portion and a speed ratio of the electrically controlled differential portion. With such a structure, utilizing the speed ratio of the shifting portion enables the drive force to be obtained in a wide range.

BRIEF DESCRIPTION OF THE DRAWINGS

FIG. 1 is a skeleton diagram showing a structure of a drive system of one embodiment according to the present invention for use in a hybrid vehicle.

FIG. 2 is a functional diagram illustrating operations of hydraulically operated frictional engaging devices in combination for use in shifting action of the drive system shown in FIG. 1.

FIG. 10 is a view showing an effectuation determining map for first and second high-speed rotation preventing controls.

DETAILED DESCRIPTION OF THE EMBODIMENTS

Figure 3:
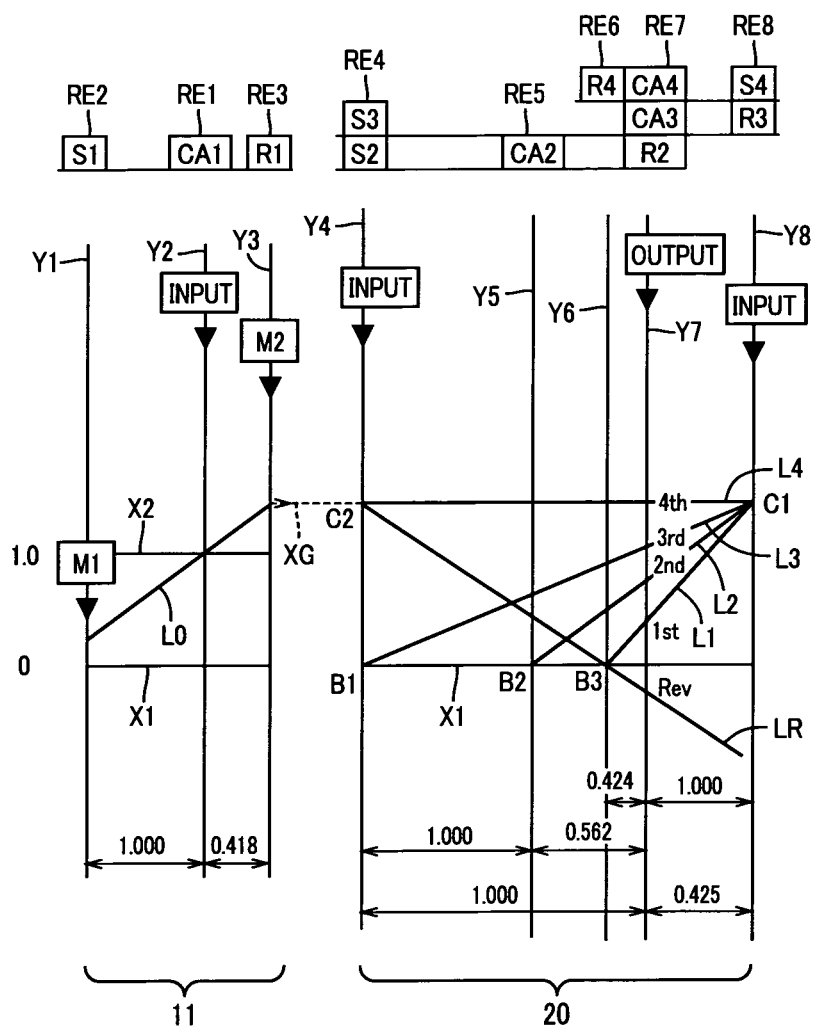
FIG. 3 is a collinear chart indicating mutually related rotating speeds of rotary elements establishing various gear positions in the drive system shown in FIG. 1.

Now, an embodiment of the present invention will be described below in detail with reference to the accompanying drawings.

FIG. 1 is a skeleton diagram for illustrating a transmission mechanism 10 constituting a part of a drive system for a hybrid vehicle to which the present invention is applied. As shown in FIG. 1, the shifting mechanism 10 includes a transmission case 12, an input shaft 14, a differential portion 11, an automatic transmission portion i.e. shifting portion 20, and an output shaft 22. In detail, the transmission case (hereinafter referred to as "a case 12") is mounted on a vehicle body as a non-rotary member, and the input shaft 14 is coaxially disposed inside the case 12 as an input rotary member. The differential portion 11 is coaxially connected to the input shaft 14 either directly or indirectly via a pulsation absorbing damper (vibration damping device) not shown, and serving as a continuously variable shifting portion. The automatic transmission portion 20 is connected in series in a power transmitting path between the differential portion 11 and drive wheels 34 (see FIG. 7) through a power transmitting member 18 (power transmitting shaft). The output shaft 22 connected to the automatic shifting portion 20 and serving as an output rotary member.

In transmission mechanism 10 may be preferably employed in, for instance, an FR (front-engine and reverse-drive) type vehicle to be disposed in a longitudinal direction of the vehicle. The transmission mechanism 10 is disposed between an engine 8, and a pair of drive wheels 34. The engine 18 is as an internal combustion engine like a gasoline engine and diesel engine or the like, which serves as a drive-power source and is directly connected to the input shaft 12 in series or indirectly through the pulsation absorbing damper (vibration damping device), not shown, This allows a vehicle drive force to be transferred from the engine 8 to the pair of drive wheels 34 in sequence through a differential gear device 32 (final speed reduction gear) (see FIG. 7), constituting a part of a power-transmitting path, and a pair of drive axles. In addition, the transmission mechanism 10 of the present embodiment corresponds to a vehicular drive system of the present invention, and the automatic shifting portion 20 corresponds to a shifting portion of the present invention.

In the transmission mechanism 10 of the illustrated embodiment, the engine 8 and differential portion 11 are directly connected to each other. As used herein, the term "directly connected to each other" refers to a connection established in the absence of a fluid-operated power-transmitting device such as a torque converter or fluid engaging device or the like, and the connection including, for instance, the pulsation absorbing damper is involved in such a direct connection. Since the transmission mechanism 10 includes upper and lower halves constructed in a symmetric relation with each other along a central axis, and therefore the lower half is omitted from the skeleton diagram of FIG. 1. This similarly applies to the other embodiments of the invention described below.

The differential portion 11 includes a first electric motor M1, a power distributing mechanism 16 taking the form of a mechanical mechanism through which an output of the engine 8 applied to the input shaft 14 is mechanically distributed, and a second electric motor M2 operatively connected to the power-transmitting member 18 for unitary rotation therewith. The power distributing mechanism 16 serves as a differential mechanism through which the output of the engine 8 is distributed to the first electric motor M1 and power-transmitting member 18. In the illustrated embodiment, both the first electric motors M1 and the second electric motor M2 are so-called motor/generators each having a function to generate electric power. The first electric motor M1 has at least a function to act as a generator (to generate electric power) for generating a reaction force. The second electric motor M2 has at least a function of a motor (electric motor) to act as a running drive power source to output a vehicle drive force. The power-transmitting member 18 corresponds to an output shaft of the differential mechanism of the present invention.

The power distributing mechanism 16 is mainly comprised of a first planetary gear set 24 of a single-pinion type having a given gear ratio $\rho 1$ in the order of, for instance, approximately "0.418". The first planetary gear set 24 includes rotary elements (hereinafter referred to as "elements") such as a sun gear S1, a first planet gear P1, a first carrier CA1 rotatably supporting the first planetary gear P1 to be rotatable about its axis while performing an orbital motion, and a first ring gear R1 in meshing engagement with the first sun gear S1 via the first planet gears P1. Assume that the first sun gear S1 has a gear teeth of ZS1 and the first ring gear R1 has a gear teeth of ZR1, the gear ratio $\rho 1$ is expressed as ZS1/ZR1. The power distributing mechanism 16 corresponds to the differential mechanism of the present invention.

In the power distributing mechanism 16, the first carrier CA1 is connected to the input shaft 14, i.e., the engine 8; the first sun gear S1 is connected to the first electric motor M1; and the first ring gear R1 is connected to the power-transmitting member 18. With the power distributing mechanism 16 of such a structure, the three elements of the first planetary gear set 24, i.e., the first sun gear S1, the first planetary gears P1, the first carrier CA1 and the first ring gear R1 are enabled to rotate relative to each other. This allows a differential action to be initiated, i.e., a differential state is provided to initiate the differential action. Thus, an output of the engine 8 is distributed to the first electric motor M1 and the power-transmitting mechanism 18.

Then, a part of the distributed engine output is used to drive the first electric motor M1 for generation of electric energy, which is stored in a battery and used for rotatably driving the second electric motor M2. Thus, the differential portion 11 (power distributing mechanism 16) is rendered operative as an electrically controlled differential device such that, for instance, the differential portion 11 is placed in a so-called continuously variable transmission state (electrically controlled CVT state). This causes a rotation of the power-transmitting member 18 to be continuously varied regardless of the engine 8 operating at a given rotation speed.

That is, the differential portion 11 is caused to function as an electrically controlled continuously variable transmission to provide a speed ratio $\gamma 0$ (rotation speed $N_{IN}$ of input shaft 14/rotation speed $N_{18}$ of power-transmitting member 18) that is continuously variable in a range from a minimum value $\gamma 0min$ to a maximum value $\gamma 0max$. This controls operating states of the first electric motor M1, the second electric motor M2 and the engine 8 connected to the power distributing mechanism 16 (differential portion 11), thereby controlling a differential state between a rotation speed of the input shaft 14 and a rotation speed of the power-transmitting member 18.

The automatic shifting portion 20, forming a part of the power-transmitting path between the differential portion 11 and drive wheels 34, includes a second planetary gear set 26 of a single-pinion type, a third planetary gear set 28 of a single-pinion type and a fourth planetary gear set 30 of a single-pinion type. The automatic shifting portion 20 is a planetary gear type multiple-step transmission operable as a step-variable automatic transmission. The second planetary gear set 26 has a second sun gear S2, a second planetary gear P2, a second carrier CA2 supporting the second planetary gear P2 to be rotatable about its axis and about the axis of the second sun gear S2, and a second ring gear R2 meshing with the second sun gear S2 through the second planetary gears P2. For example, the second planetary gear set 26 has a given gear ratio ρ2 of about "0.562". The third planetary gear set 28 has a third sun gear S3, a third planetary gear P3, a third carrier CA3 supporting the third planetary gears P3 to be rotatable about its axis and about the axis of the third sun gear S3, and a third ring gear R3 meshing with the third sun gear S3 through the third planetary gears P3. For example, the third planetary gear set 28 has a given gear ratio ρ3 of about "0.425".

The fourth planetary gear set 30 has a fourth sun gear S4, a fourth planetary gear P4, a fourth carrier CA4 supporting the fourth planetary gears P4 to be rotatable about its axis and about the axis of the fourth sun gear S4, and a fourth ring gear R4 meshing with the fourth sun gear S4 through the fourth planetary gears P4. For example, the fourth planetary gear set 30 has a given gear ratio ρ4 of, for instance, about "0.421". With the second sun gear S2, the second ring gear R2, the third sun gear S3, the third ring gear R3, the fourth sun gear S4 and the fourth ring gear R4 having the numbers of gear teeth represented by ZS2, ZR2, ZS3, ZR3, ZS4 and ZR4, respectively, the gear ratios ρ2, ρ3 and ρ4 are expressed as ZS2/ZR2, ZS3/ZR3, and ZS4/ZR4, respectively.

In the automatic shifting portion 20, the second and third sun gears S2 and S3 are integrally connected to each other, selectively connected to the power-transmitting member 18 through a second clutch C2, and selectively connected to the casing 12 through a first brake B1. The second carrier CA2 is selectively connected to the casing 12 through a second brake B2, and the fourth ring gear R4 is selectively connected to the casing 12 through a third brake B3. The second ring gear R2, third carrier CA3 and fourth carrier CA4 are integrally connected to each other and connected to the output shaft 22. The third ring gear R3 and fourth sun gear S4 are integrally connected to each other and selectively connected to the power-transmitting member 18 through the first clutch C1.

Thus, the respective component parts of the automatic shifting portion 20 and the differential portion 11 (power-transmitting member 18) are selectively connected to each other through the first clutch C1 or the second clutch C2 used for establishing a gear position in the automatic shifting portion 20. In other words, the first and second clutches C1 and C2 function as engaging devices operative to allow the power-transmitting path between the power-transmitting member 18 and automatic shifting portion 20, that is the power-transmitting path between the differential portion 11 (power-transmitting member 18) and drive wheels 34. They are selectively placed in one of a power-transmitting state for the vehicle drive force to be transmitted through the power-transmitting path, and a power cut-off state for the vehicle drive force not to be transmitted through the power-transmitting path. That is, with at least one of the first and second clutches C1 and C2 brought into coupling engagement, the power-transmitting path is placed in the power-transmitting state. In contrast, disengaging both the first and second clutches C1 and C2 places the power-transmitting path in the power cut-off state.

With the automatic shifting portion 20, disengaging an on-disengagement side engaging device while engaging an on-engagement side engaging device allows a so-called "clutch-to-clutch" shifting action to be executed for respective gear positions (gear shift positions) to be selectively established. This allows a speed ratio γ (rotation speed $N_{18}$ of the power-transmitting member 18/rotation speed $N_{OUT}$ of the output shaft 22) to be varied in nearly equal ratio i.e. geometrically for each gear position. For instance, as indicated in an engagement operation table shown in FIG. 2, engaging the first clutch C1 and third brake B3 establishes 1st-speed gear position having a speed ratio γ1 of approximately, for instance, "3.357". Engaging the first clutch C1 and the second brake B2 establishes a 2nd-speed gear position with a speed ratio γ2 of, for instance, approximately "2.180", which is lower a value of the 1st-speed gear position.

With the first clutch C1 and the first brake B1 engaged in operation, a 3rd-speed gear position is established with a speed ratio γ3 of, for instance, approximately "1.424", which is lower a value of the 2nd-speed gear position. Engaging the first clutch C1 and the second clutch C2 establishes a 4th-speed gear position with a speed ratio γ4 of, for instance, approximately "1.000", which is lower than a value of the 3rd-speed gear position. Further, engaging the second clutch C2 and the third brake B3 establishes a reverse-drive gear position (reverse-drive gear shift position) with a speed ratio γR of, for instance, approximately, 3.209, which is intermediate between values of the 1st-speed and the 2nd-speed gear positions. In addition, disengaging the first clutch C1, second clutch C2, first brake B1, second brake B2 and third brake B3 allows a neutral position "N" to be established.

The first clutch C1, second clutch C2, first brake B1, second brake B2 and third brake B3 (hereinafter collectively referred to as clutch C and brake B, unless otherwise specified) are hydraulically operated frictional engaging devices used in vehicular automatic transmissions of the related art. Each of these frictional engaging devices may include a wet-type multiple-disc clutch, having a plurality of mutually overlapping friction plates adapted to be pressurized against each other by a hydraulic actuator, or a band brake including a rotary drum having an outer circumferential surface on which one band or two bands are wound with terminal ends being adapted to be tightened by a hydraulic actuator. Thus, the frictional engaging device serves to selectively provide a drive connection between two component parts between which each clutch or brake is interposed. Moreover, the clutch C and brake B of the present embodiment correspond to hydraulically operated frictional engaging devices of the present invention.

In the transmission mechanism 10 of such a structure mentioned above, the differential portion 11 serving as the continuously variable transmission, and the automatic shifting portion 20, constitute a continuously variable transmission. Further, with the differential portion 11 controlled so as to provide a speed ratio kept at a fixed level, the differential portion 11 and the automatic shifting portion 20 are enabled to establish a state equivalent to a step-variable transmission.

More particularly, the differential portion 11 functions as the continuously variable transmission, and the automatic shifting portion 20, connected to the differential portion 11 in series functions as the step-variable transmission. Thus, the rotation speed input to the automatic shifting portion 20 (hereinafter referred to as "input rotation speed of the automatic shifting portion 20") placed in at least one gear position "M", i.e., the rotation speed of the power-transmitting member 18 (hereinafter referred to as "transmitting-member rotation speed $N_{18}$") is caused to continuously vary. Thus, a continuously variable speed range is obtained in the gear position "M". Accordingly, the transmission mechanism 10 can have an overall speed ratio γT (rotation speed $N_{IN}$ of the input shaft 14/rotation speed $N_{OUT}$ of the output shaft 22) in an infinitely varying mode. Thus, a continuously variable transmission is structured in the transmission mechanism 10. The overall speed ratio γT of the transmission mechanism 10 represents a total speed ratio γT of a whole of the automatic shifting portion 20 established based on both the speed ratio 70 of the differential portion 11 and speed ratio γ of the automatic shifting portion 20.

For the respective gear positions such as the 1st-speed to the 4th-speed gear positions of the automatic shifting portion 20 and the reverse-drive gear position shown in, for instance, the engagement operation table shown in FIG. 2, the transmitting-member rotation speed $N_{18}$ is infinitely varied with each gear position obtained in an infinitely variable speed range. Accordingly, an infinitely and continuously variable speed ratio is present between adjacent gear positions, enabling a whole of the transmission mechanism 10 to have an infinitely variable total speed ratio γT.

With the differential portion 11 controlled to obtain a fixed speed ratio while the clutch C and the brake B are selectively engaged, either one of the 1st-speed to the 4th-speed gear positions or the reverse-drive gear position (reverse-drive shift position) is selectively established. This allows the transmission mechanism 10 to have each gear position with a total speed ratio γT being variable in a nearly equal ratio. Thus, the transmission mechanism 10 can be established in the same state as that of the step-variable transmission.

With the differential portion 11 controlled so as to have a speed ratio γ0 fixed at a value of "1", the transmission mechanism 10 has the total speed ratio γT for each gear position of the 1st-speed to the 4th-speed gear positions of the automatic shifting portion 20 and the reverse-drive gear position as indicated by, for instance, the engagement operation table shown in FIG. 2. Further, if the automatic shifting portion 20 is controlled under the 4th-speed gear position so as to cause the differential portion 11 to have the speed ratio γ0 of approximately, for instance, "0.7" less than a value of "1", the automatic shifting portion 20 has the total speed ratio γT of approximately, for instance, "0.7" that is less than a value of the 4th-speed gear position.

FIG. 3 is a collinear chart for the transmission mechanism 10 including the differential portion 11 and the automatic shifting portion 20, wherein the relative motion relationships among the rotation speeds of the various rotary elements in different engaging states for each gear position can be plotted on straight lines. The collinear chart of FIG. 3 takes the form of a two-dimensional coordinate system having the abscissa axis plotted with the gear ratios ρ of the planetary gear sets 24, 26, 28, 30, and the ordinate axis plotted with the mutually relative rotating speeds of the rotary elements. A transverse line X1 indicates the rotation speed that is zeroed; a transverse line X2 the rotation speed of "1.0", that is, the rotating speed $N_E$ of the engine 8 connected to the input shaft 14; and a transverse line XG the rotation speed of the power-transmitting member 18.

Starting from the left, three vertical lines Y1, Y2 and Y3, associated with three elements of the power distributing mechanism 16 forming the differential portion 11, represent the mutually relative rotating speeds of the first sun gear S1 corresponding to a second rotary element (second element) RE2, the first carrier CA1 corresponding to a first rotary element (first element) RE1 and the first ring gear R1 corresponding to a third rotary element (third element) RE3, respectively. A distance between the adjacent vertical lines is determined based on the gear ratio ρ1 of the first planetary gear set 24.

Starting from the left, further, five vertical lines Y4, Y5, Y6, Y7 and Y8 for the automatic shifting portion 20 represent the mutually relative rotating speeds of: the second and third sun gears S2 and S3 connected to each other, which corresponds to a fourth rotary element (fourth element) RE4; the second carrier CA2 corresponding to a fifth rotary element (fifth element) RE5; the fourth ring gear R4 corresponding to a sixth rotary element (sixth element) RE6; the second ring gear R2 and third and fourth carriers CA3 and CA4 connected to each other, which correspond to a seventh rotary element (seventh element) RE7; and the third ring gear R3 and fourth sun gear S4 connected to each other and corresponding to an eighth rotary element (eighth element) RE8, respectively. Each distance between the adjacent vertical lines is determined based on the gear ratios ρ2, ρ3 and ρ4 of the second, third and fourth planetary gear sets 26, 28 and 30.

In the relationship between the vertical lines on the collinear chart, if a space between the sun gear and the carrier is set to a distance corresponding to a value of "1", then, a space between the carrier and the ring gear lies at a distance corresponding to the gear ratio ρ of the planetary gear set. That is, for the differential portion 11, a space between the vertical lines Y1 and Y2 is set to the distance corresponding to the value of "1", and a space between the vertical lines Y2 and Y3 is set to the distance corresponding to the gear ratio ρ1. For the automatic shifting portion 20, further, a space between the sun gear and carrier is set to the distance corresponding to the value of "1" for each of the second, third and fourth planetary gear sets 26, 28 and 30, for which the space between the carrier and the ring gear is set to the distance corresponding to the gear ratio ρ.

Upon describing a detail with reference to the collinear chart of FIG. 3, the transmission mechanism 10 of the present embodiment is structured under following connecting state of the power distributing mechanism 16 (differential portion 11), such that a rotary motion of the input shaft 14 is transmitted (input) to the automatic shifting portion 20 through the power-transmitting member 18. That is, the first rotary element RE1 (first carrier CA1) of the first planetary gear set 24 is connected to the input shaft 14, i.e., the engine 8, and the second rotary element RE2 is connected to the first electric motor M1 while the third rotary element (first ring gear R1) RE3 is connected to the power-transmitting member 18 and second electric motor M2. In the power distributing mechanism 16, with such a structure, an inclined straight line L0 passing across a point of intersection between the lines Y2 and X2, represents the relationship between the rotation speeds of the first sun gear S1 and first ring gear R1.

In the differential portion 11, for example, if the first to third rotary elements RE1 to RE3 are placed in differential states to rotate relative to each other, and the rotation speed of the first ring gear R1 indicated at an intersecting point between the straight line L0 and vertical line Y1 is bound with the vehicle speed V to remain at a nearly fixed level, controlling the engine rotation speed $N_E$ causes the rotation speed of the first carrier CA1, as represented by an intersecting point between the straight line L0 and vertical line Y2, to be raised or lowered. This raises or lowers the rotation speed of the first sun gear S1, i.e., the rotation speed of the first electric motor M1, indicated by an intersecting pint between the straight line L0 and vertical line Y1.

With the rotation speed of the first electric motor M1 controlled to allow the differential portion 11 to have the speed ratio γ0 fixed at a value of "1", the first sun gear S1 rotates at the same speed as the engine rotation speed $N_E$. In this moment, the straight line L0 is aligned with the horizontal line X2, then the first ring gear R1, i.e., the power-transmitting member 18, is caused to rotate at the same speed as the engine rotation speed $N_E$. On the contrary, if the rotation speed of the first electric motor M1 is controlled so as to allow the differential portion 11 to have the speed ratio γ0 fixed at a value less than "1", i.e., for instance, a value of approximately "0.7", the rotation speed of the first sun gear S1 is zeroed. In this case, the transmitting-member rotation speed $N_{18}$ of the power-transmitting member 18 is caused to increase to a speed higher than the engine rotation speed $N_E$.

In the automatic shifting portion 20, the fourth rotary element RE4 is selectively connected to the power-transmitting member 18 via the second clutch C2 and also selectively connected to the casing 12 via the first brake B1. The fifth rotary element RE5 is selectively connected to the casing 12 via the second brake B2. The sixth rotary element RE6 is selectively connected to the casing 12 via the third brake B3. The seventh rotary element RE7 is connected to the output shaft 22 and the eighth rotary element RE8 is selectively connected to the power-transmitting member 18 via the first clutch C1.

In the automatic shifting portion 20, as the first clutch C1 is engaged, the differential portion 11 operates to transfer the vehicle drive force of the power-transmitting member 18 (third rotary elements RE3) to the eighth rotary element RE8, and the first clutch C1 and the third brake B3 are engaged as shown in FIG. 3. In this case, the rotation speed of the output shaft 22 for the 1st-speed (1st) gear position is represented by an intersecting point between the inclined straight line L1 and an intersecting point intersecting the vertical line Y7. The straight line L1 passes across an intersecting point between the vertical line Y8 indicative of the rotation speed of the eighth rotary element RE8, and the horizontal line XG and an intersecting point between the vertical line Y6 indicative of the rotation speed of the sixth rotary element RE6, and the horizontal line X1. The intersecting point intersects the vertical line Y7 representing the rotation speed of the seventh rotary element RE connected to the output shaft 22.

Similarly, the rotation speed of the output shaft 22 for the 2nd-speed gear position is represented by an intersecting point between an inclined straight line L2 determined upon engagements of the first clutch C1 and second brake B2, and the vertical line Y7 representing the rotation speed of the seventh rotary element RE7 connected to the output shaft 22. The rotation speed of the output shaft 22 for the 3rd-speed gear position is represented by an intersecting point between an inclined straight line L3 determined with the first clutch C1 and first brake B1 being engaged, and the vertical line Y7 representing the rotation speed of the seventh rotary element RE7 connected to the output shaft 22. The rotation speed of the output shaft 22 for the 4th-speed gear position is represented by an intersecting point between a horizontal straight line L4 determined with the first clutch C1 and second brake B2 being engaged, and the vertical line Y7 indicative of the rotation speed of the seventh rotary element RE7 connected to the output shaft 22.

Figure 4:
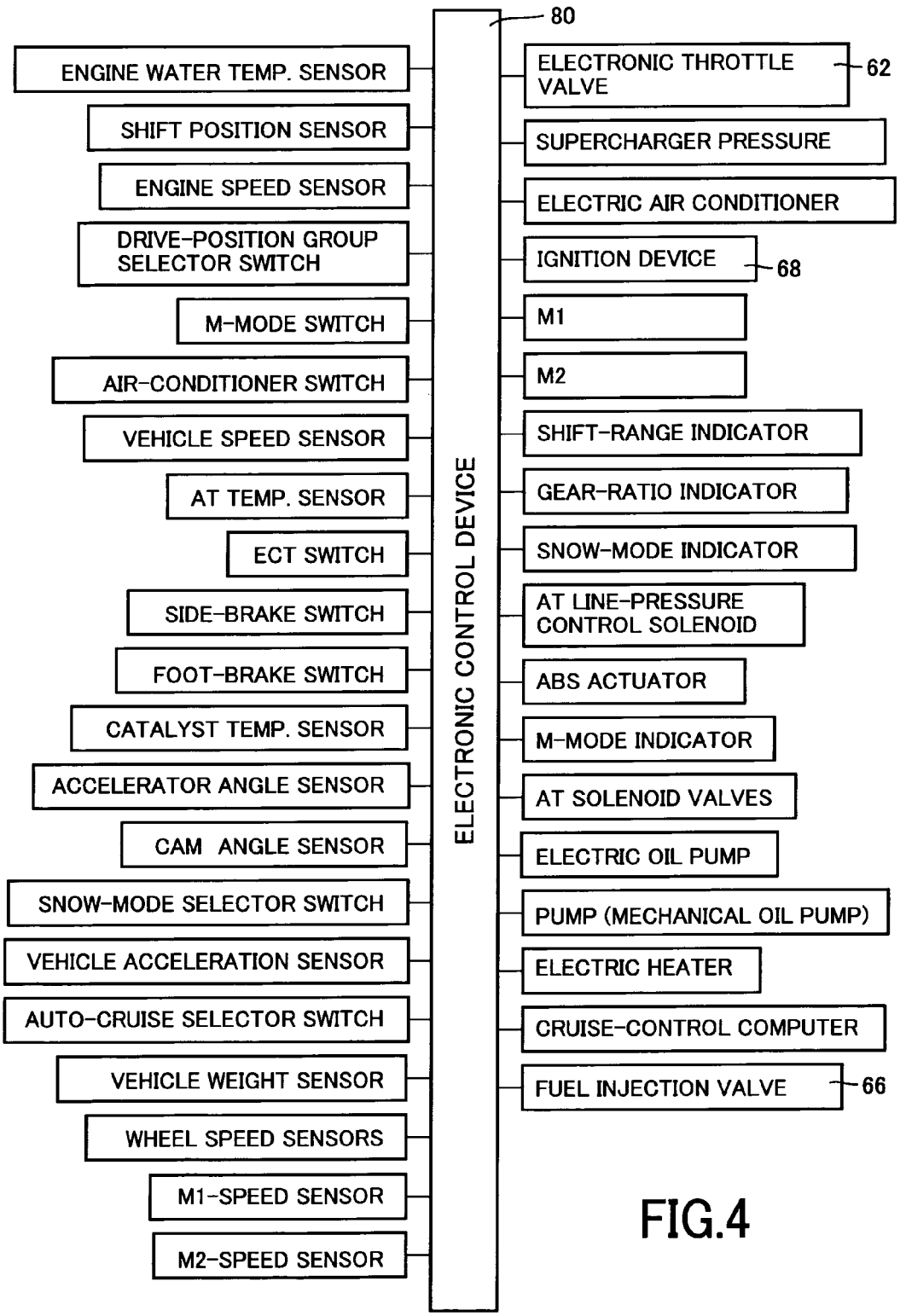
FIG. 4 is a view illustrating input and output signals of an electronic controlling unit provided in the drive system shown in FIG. 1.

FIG. 4 shows various sensors for generating input signals and various component parts applied with output signals output from an electronic controlling unit 80 for controllably operating the transmission mechanism 10 of the present embodiment. The electronic controlling unit 80 includes a so-called microcomputer incorporating a CPU, a ROM, a RAM and input/output interfaces. The microcomputer is programmed to perform signal processing according to programs preliminarily stored in the ROM while utilizing a temporary data storing function of the RAM, thereby executing drive controls such as a hybrid drive control of the engine 8 and a shifting control of the automatic shifting portion 20.

The electronic controlling unit 80, connected to the various sensors and switches as shown in FIG. 4, is supplied with various signals such as: a signal indicative of an engine coolant temperature $TEMP_W$; a signal representing the number of operations selected for a shift position $P_{SH}$ and "M" position shifted with a shift lever 52 (see FIG. 6); a signal representing the engine rotation speed $N_E$ indicative of the rotation speed of the engine 8; a signal representing a gear train preset value; a signal commanding an "M" mode (manual shift running mode); a signal representing an operated state of an air conditioner; a signal representing a vehicle speed V corresponding to the rotation speed (hereinafter referred to as "output shaft rotation speed") $N_{OUT}$ of the output shaft 22; a signal representing a temperature $T_{OIL}$ of working oil of the automatic shifting portion 20; a signal representing a side brake under operation; and a signal representing a foot brake under operation, etc.

In addition, the electronic controlling unit 80 is further supplied with other various signals such as: a signal representing a catalyst temperature; a signal representing an accelerator opening Acc indicative of a displacement of an accelerator pedal (see FIG. 7) when manipulated by a driver for his output demand value; a signal representing a cam angle; a signal representing a snow mode under setting; a signal representing a fore and aft acceleration value G of a vehicle; a signal representing an auto-cruising drive mode; a signal representing a weight (vehicle weight) of the vehicle; a signal representing a wheel velocity of each drive wheel; a signal representing a rotation speed $N_{M1}$ of the first electric motor M1 (hereinafter referred to as "first electric-motor rotation speed $N_{M1}$); a signal representing a rotation speed $N_{M2}$ of the second electric motor M2 (hereinafter referred to as "second electric-motor rotation speed $N_{M2}$); and a signal representing a state of charge (charged state) SOC of a battery 60 (see FIG. 7), etc.

The electronic controlling unit 80 generates various output signals such as control signals, applied to an engine output control device 58 (see FIG. 7) for controlling an engine output. For instance, these include: a drive signal applied to a throttle actuator 64 for controlling a throttle valve opening $\theta_{TH}$ of an electronic throttle valve 62 mounted on an intake manifold 60 of the engine 8; a fuel supply quantity signal applied to a fuel injecting device 66 for controlling an amount of fuel being injected into the intake manifold 60 or cylinders of the engine 8; an ignition signal applied to an ignition device 68 for commanding an ignition timing of the engine 8; a supercharger pressure regulation signal for regulating a supercharger pressure; an electric air-conditioner drive signal for actuating an electric air-conditioner; command signals for commanding the first and second electric motors M1 and M2 to be operated; and a shift-position (manipulated position) display signal for actuating a shift-range indicator.

In addition, the electronic controlling unit 80 generates other various output signals such as a gear-ratio indicating signal for displaying the gear ratio; a snow-mode display signal for displaying the presence of a snow-mode; an ABS actuation signal for operating an ABS actuator to preclude slippages of the drive wheels during a braking phase; an "M" mode display signal for displaying an "M" mode being selected; valve command signals for actuating electromagnetic valves (linear solenoid valves) incorporated in the hydraulic pressure controlling circuit 70 (see FIGS. 5 and 7) for controlling the hydraulic actuators of the hydraulically operated frictional engaging devices of the differential portion 11 and automatic shifting portion 20; a drive command signal for operating a regulator valve (pressure regulator valve) incorporated in the hydraulic pressure controlling circuit 70, to regulate a line pressure PL; a drive command signal for actuating an electric hydraulic pump acting as a hydraulic original-pressure source for the line pressure $P_L$ to be regulated; a signal for driving an electric heater; and a signal applied to a cruise-control controlling computer, etc.

Figure 5:
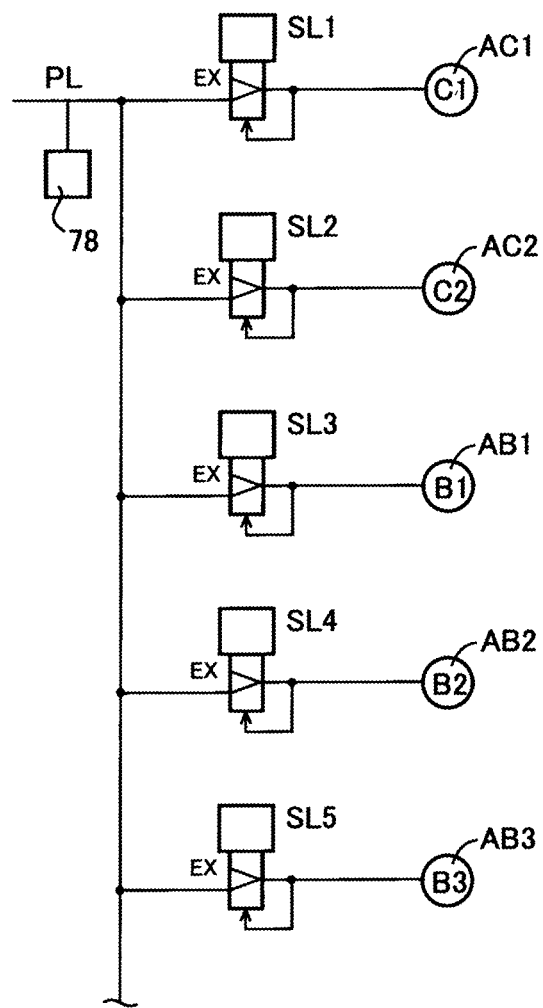
FIG. 5 is a circuit diagram related to linear solenoid valves for controlling operations of respective hydraulic actuators of clutches C and brakes B of a hydraulic pressure controlling circuit.

FIG. 5 is a circuit diagram related to linear solenoid valves SL1 to SL5 of the hydraulic pressure controlling circuit 70 for controlling the operations of respective hydraulic actuators (hydraulic cylinders) AC1 and AC2 and AB1 to AB3 of the clutches C1 and C2 and brakes B1 to B3.

As shown in FIG. 5, the respective linear solenoid valves SL1 to SL5 regulate a line hydraulic pressure PL to respective clutch engaging pressures PC1 and PC2 and PB1 to PB3, depending on the command signals delivered from the electronic controlling unit 80, which are directly supplied to the hydraulic actuators AC1 and AC2 and AB1 to AB3. The line pressure PL is provided from an original hydraulic pressure, generated by an electrically operated hydraulic oil pump (not shown) or a mechanical oil pump driven by the engine 8, which is regulated by, for instance, a relief-type pressure regulator valve depending on a load of the engine 8 in terms of the accelerator opening displacement $A_{CC}$ or throttle valve opening $\theta_{TH}$.

The linear solenoid valves SL1 to SL5, basically formed in the same structures, are independently energized or de-energized with the electronic controlling unit 80 to cause the hydraulic actuators AC1, AC2, AB1, AB2, AB3 to independently and controllably regulate the hydraulic pressures, thereby controlling the clutch engaging pressures PC1 and PC2 and PB1 to PB3. With the automatic shifting portion 20, predetermined frictional engaging devices are engaged in a pattern indicated on, for instance, the engagement operation table shown in FIG. 2, thereby establishing a selected one of various gear positions. In addition, during the shifting control of the automatic shifting portion 20, a so-called clutch-to-clutch shifting is executed to simultaneously control the engagement or disengagement of the clutches C and brakes B relevant to, for instance, the shifting operations.

Figure 6:
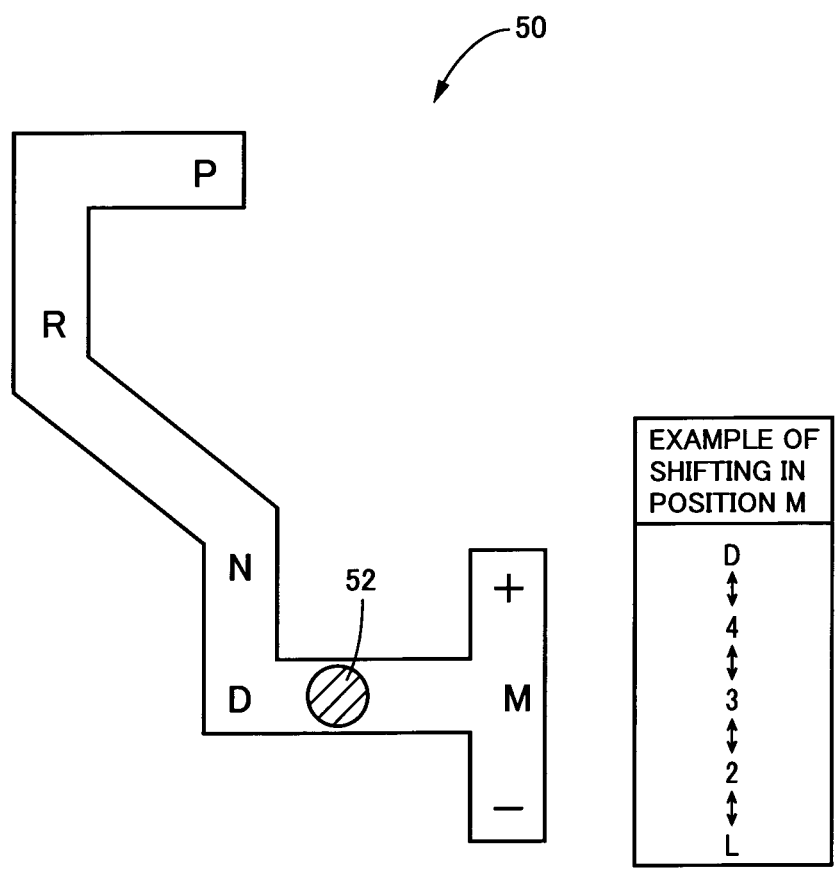
FIG. 6 is a view showing one example of a shift operating device including a shift lever operative to select one of a plurality of shift positions of multiple kinds.

FIG. 6 is a view showing one example of the manually operated shifting device 50 serving as a changeover device operative to shift multiple kinds of shift positions $P_{SH}$ on manual operations. The shifting device 50 is mounted on the vehicle in an area lateral to, for instance, a driver's seat and includes the shift lever 52 to be manipulated for selecting one of the plurality of shift positions $P_{SH}$.

The shift lever 52 has a structure that can be manually selected to a parking position "P (Parking)", a reverse drive position "R (Reverse)", a neutral position "N (Neutral)", a forward-drive automatic-shift drive position "D (Drive)" or a forward-drive manual-shift position "M (Manual)". Among these, the "P" position represents a position in which an internal path of the transmission mechanism 10, i.e., the power transmitting path inside the automatic shifting portion 20 is shut off in a neutrality, i.e., in a neutral condition, with the output shaft 22 of the automatic shifting portion 20 remained in a locked state. The "R" position represents a position for a reverse-drive mode. The "N" position represents a position in which the power transmitting path of the transmission mechanism 10 is shut off in a neutral state.

The "D" position represents a position for an automatic shift mode to be established to perform an automatic shift control within a variable range of a shiftable total speed ratio γT of the transmission mechanism 10 obtained by various gear positions that are subjected to the automatic shift control within an infinitely variable speed ratio of the differential portion 11 and a range selected from the 1st-speed to the 4th-speed gear positions of the automatic shifting portion 20. The "M" position represents a position for a manual-shift forward-drive mode (manual mode) to be established for a so-called shift range that limits a shifting gear position on a high-speed gear range during the operation of the automatic shifting portion 20 under the automatic shift control.

When the shift lever 52 is manually shifted to the various shift positions $P_{SH}$, for instance, the hydraulic pressure controlling circuit 70 is electrically switched so as to establish each gear position of the reverse-drive "R" gear position, the neutral position "N" and one of various gear positions in the forward-drive gear position "D".

Among the various shift positions $P_{SH}$ represented by the "P" to "M" positions, the "P" and "N" positions represent non-running positions selected for the vehicle not to run. That is, the "P" and "N" positions represent non-drive positions in which the power-transmitting path is selected for placement in a power cut-off state using the first and second clutches C1 and C2. In this case, both the first and second clutches C1 and C2 are disengaged as indicated in, for instance, the engagement operation table shown in FIG. 2, to interrupt the power-transmitting path inside the automatic shifting portion 20 so as to render the vehicle not to be driven.

The "R", "D" and "M" positions represent running positions selected for the vehicle to run as indicated in, for instance, the engagement operation table shown in FIG. 2. These positions represent drive positions in which the power-transmitting path is switched to a power-transmitting state upon the operations of the first and/or second clutches C1 and C2 under which at least one of the first and second clutches C1 and C2 is engaged to establish the power-transmitting path in the automatic shifting portion 20 so as to enable the vehicle to be driven.

More particularly, the shift lever 52 is manually shifted from the "P" position or "N" position to the "R" position. In this case, the second clutch C2 is engaged to cause the power-transmitting path of the automatic shifting portion 20 to be switched from the power cut-off state to the power-transmitting state. With the shift lever 52 manually shifted from the "N" position to the "D" position, at least the first clutch C1 is engaged to switch the power-transmitting path of the automatic shifting portion 20 from the power cut-off state to the power-transmitting state. Further, as the shift lever 52 is manually shifted from the "R" position to the "P" or "N" position, the second clutch C2 is disengaged to switch the power-transmitting path of the automatic shifting portion 20 from the power-transmitting state to the power cut-off state. With the shift lever 52 manually shifted from the "D" position to the "N" position, the first clutch C1 or second clutch C2 is disengaged to switch the power-transmitting path of the automatic shifting portion 20 from the power-transmitting state to the power cut-off state.

Figure 7:
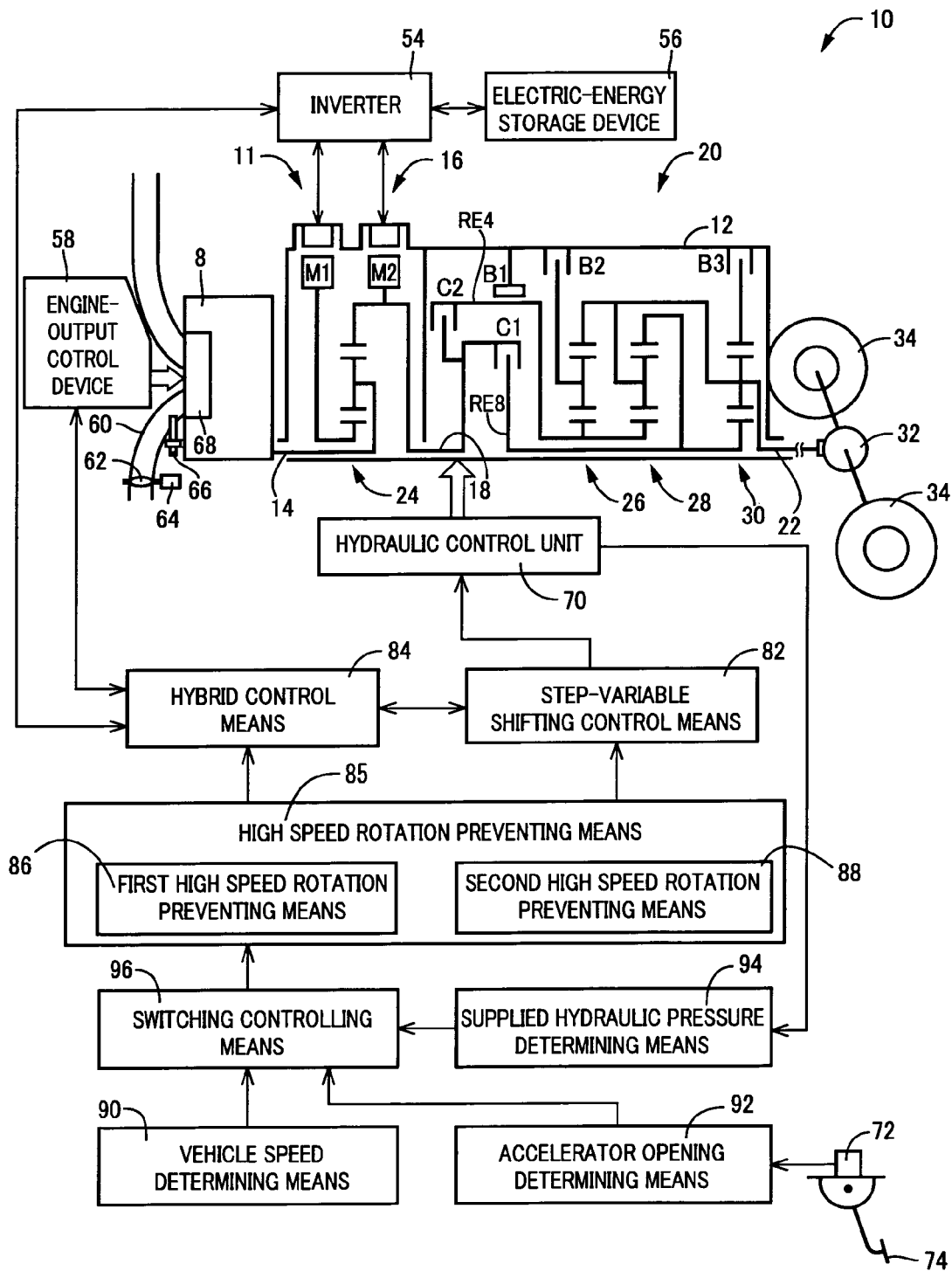
FIG. 7 is a functional block diagram illustrating a major control function of the electronic controlling unit of FIG. 4.
Figure 8:
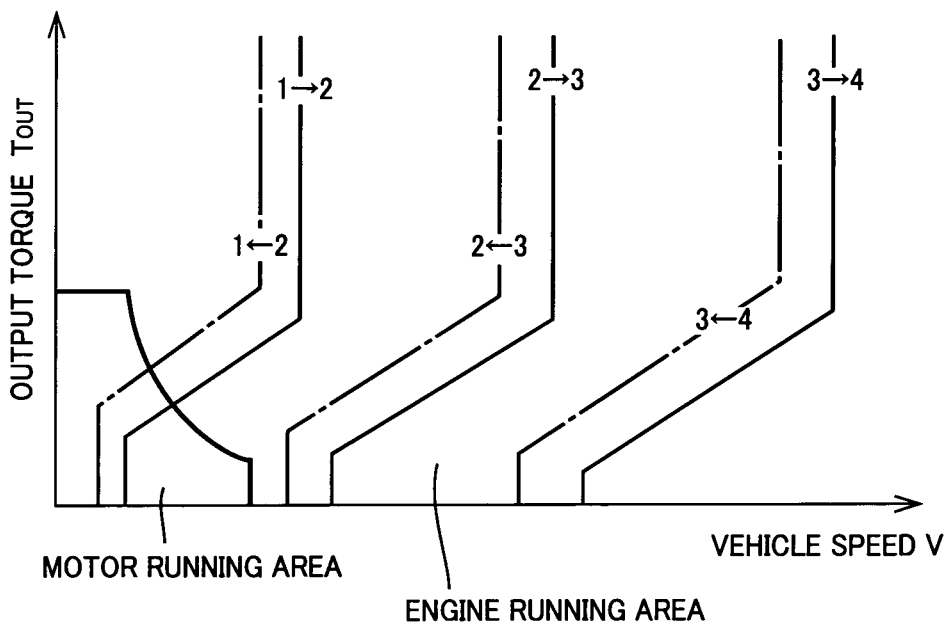
FIG. 8 is a view illustrating one example of a shifting map for use in performing a shifting control of the drive system, and one example of drive-power-source map for use in a drive-power-source switching control between an engine-drive mode and a motor-drive mode, with those maps being shown in respective relationships.

FIG. 7 is a functional block diagram illustrating major control functions to be executed by the electronic controlling unit 80. As shown in FIG. 7, step-variable shifting control means 82 determines whether to execute the shifting of the automatic shifting portion 20, i.e., a gear position to be shifted in the automatic shifting portion 20. The determination is based on a vehicle condition represented by an actual vehicle speed V and demanded output torque $T_{OUT}$ by referring to the relationships (shifting lines and shifting map) involving upshift lines (in solid lines) and downshift lines (in single dot lines) preliminarily stored as parameters of the vehicle speed V and output torque $T_{OUT}$ as shown in FIG. 8. Upon determination, the step-variable shifting control means 82 allows the automatic shifting portion 20 to execute an automatic shifting control so as to obtain the determined gear position.

When this takes place, the step-variable shifting control means 82 outputs commands (a shifting output command and a hydraulic pressure command) for engaging and/or disengaging the hydraulically operated frictional engaging devices, involved in the shifting of the automatic shifting portion 20, so as to establish the gear position in accordance with the engagement operation table shown in FIG. 2. That is, the step-variable shifting control means 82 outputs a command to the hydraulic pressure controlling circuit 70, i.e., a command for disengaging the on-disengagement side engaging device, involved in the shifting of the automatic shifting portion 20 and engaging the on-engagement side engaging device to cause the clutch-to-clutch shifting to be executed. The hydraulic pressure controlling circuit 70 operates in accordance with such commands to actuate the linear solenoid valves SL of the hydraulic pressure controlling circuit 70 for actuating the hydraulically operated actuators of the hydraulically operated frictional engaging devices involved in the relevant shifting. For instance, the on-disengagement side engaging device is disengaged, and the on-engagement side engaging device is engaged to cause the automatic shifting portion 20 to execute the shifting.

Hybrid control means 84 renders the engine 8 operative in a highly efficient operating range, while distributing the drive forces of the engine 8 and second electric motor M2 at optimum rates and optimally varying a reacting force of the first electric motor M1 during the operation thereof to generate electric power. This causes the differential portion 11 to operate as an electrically controlled continuously variable transmission to provide a controlled speed ratio γ0. For instance, at a running vehicle speed V at that time, the hybrid control means 84 calculates a total target (demanded) output for the vehicle based on the accelerator opening Acc and vehicle speed V both representing output demanded variables desired by the driver. Subsequently, the hybrid control means 84 calculates a target engine output in consideration of a loss in power transmission, loads of auxiliary units, assist torque of the second electric motor M2 or the like so as to obtain the total target output. Then, the hybrid control means 84 controls the engine 8, while controlling the first electric motor M1 to generate electric power, so as to achieve the engine rotation speed $N_E$ and engine torque $T_E$ such that the target engine output is obtained.

For instance, the hybrid control means 84 executes such controls in consideration of the gear position of the automatic shifting portion 20 with a view to increasing a dynamic performance and fuel consumption. During such hybrid controls, the differential portion 11 is rendered operative as the electrically controlled continuously variable transmission such that the engine rotation speed $N_E$ and vehicle speed V, determined for the engine 8 to operate at the high efficiency operating range, match the vehicle speed and rotation speed of the power-transmitting member 18 determined with the gear position in the automatic shifting portion 20.

Figure 9:
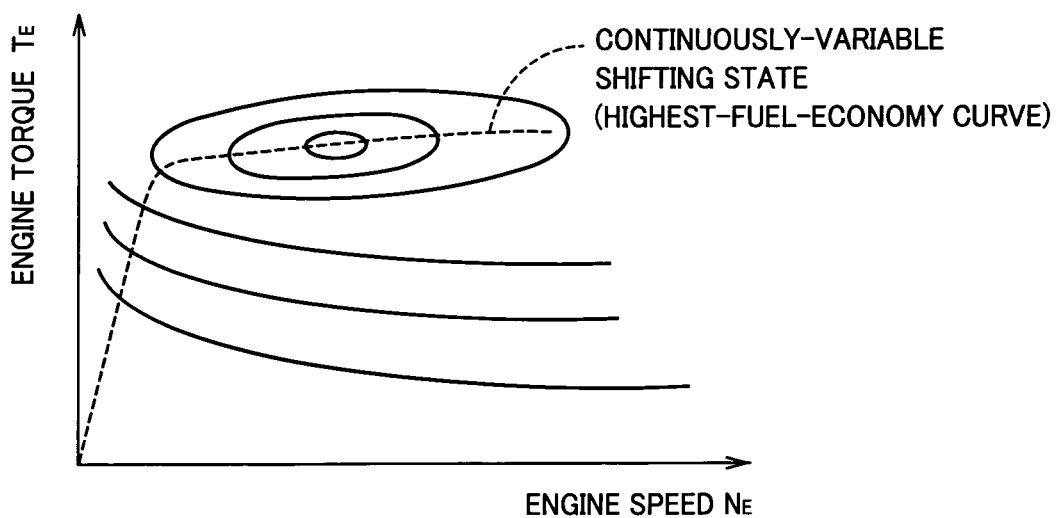
FIG. 9 is a view illustrating one example of a fuel consumption map with a broken line representing an optimum fuel consumption curve of an engine.

That is, the hybrid control means 84 determines a target value of the total speed ratio γT of the transmission mechanism 10 to control the speed ratio γ0 of the differential portion 11 in consideration of the gear position established in the automatic shifting portion 20 so as to obtain the relevant target value for thereby controlling the total speed ratio γT within the continuously variable shifting range. This causes the engine 8 to operate along an optimum fuel consumption curve (a fuel consumption map and the associated relationships) of the engine 8 obtained and stored on preliminary experiments, as indicated by a dotted line in FIG. 9, to provide a compromise between drivability and fuel consumption, during the running of the vehicle under a continuously variable shifting running mode on a two-dimensional coordinate established with the engine rotation speed $N_E$ and output torque (engine torque) $T_E$ of the engine 8. That is, the engine 8 is caused to operate to have the engine torque $T_E$ and the engine rotation speed $N_E$ to provide the engine output required for the target outputs (a total target output and demanded drive torque) to be satisfied.

When this takes place, the hybrid control means 84 allows electric energy, generated by the first electric motor M1, to be supplied through an inverter 54 to the battery 56 and second electric motor M2. Thus, a major part of drive power is mechanically transferred from the engine 8 to the power-transmitting member 18. However, a part of drive power delivered from the engine 8 is consumed with the first electric motor M1 for generating electric power and converted into electric energy. Resulting electric energy is supplied through the inverter 54 into the second electric motor M2, which is consequently driven. Therefore, the part of drive power is transferred through the second electric motor M2 to the power-transmitting member 18. Equipment, involved in the operations starting from a step of generating electric power to a step of causing the second electric motor M2 to consume resultant electric energy, establishes an electric path which converts the part of the drive power of the engine 8 into electric energy and resultant electric energy is converted into mechanical energy.

The hybrid control means 84 allows the differential portion 11 to perform an electrically controlled CVT function regardless of the vehicle remaining under a halted condition or a running condition for controlling, for instance, a first electric-motor rotation speed $N_{M1}$ and/or second electric-motor rotation speed $N_{M2}$. This causes the engine rotation speed $N_E$ to be maintained at a nearly fixed level or at an arbitrary rotation speed. In other words, the hybrid control means 84 controls the first electric-motor rotation speed $N_{M1}$ and/or second electric-motor rotation speed $N_{M2}$ at the arbitrary rotation speeds with the engine rotation speed $N_E$ maintained at the nearly fixed level or at the arbitrary rotation speed.

As will be apparent from the collinear chart shown in FIG. 3, for instance, when raising the engine rotation speed $N_E$ during the running of the vehicle, the hybrid control means 84 raises the first electric-motor rotation speed $N_{M1}$ while maintaining the second electric-motor rotation speed $N_{M2}$, bound with the vehicle speed V (represented by the velocities of the drive wheels 34), at the nearly fixed level. In addition, when maintaining the engine rotation speed $N_E$ at the nearly fixed level during the shifting of the automatic shifting portion 20, the hybrid control means 84 varies the first electric-motor rotation speed $N_{M1}$ in a direction opposite to that in which the second electric-motor rotation speed $N_{M2}$ varies with the shifting executed in the automatic shifting portion 20 while maintaining the engine rotation speed $N_E$ at the nearly fixed level.

The hybrid control means 84 functionally includes engine output control means for executing an output control of the engine 8 so as to generate a desired engine output. This is achieved upon outputting commands to the engine output control device 58 singly or in combination to execute various operations such as: an operation for rendering the throttle actuator 64 operative to controllably open or close the electronic throttle valve 62 for performing a throttle control; an operation to cause the fuel injection device 66 to control a fuel injection quantity and fuel injection timing for fuel injection control; and an operation to cause the ignition device 68 to control an ignition timing of the ignition device 68, such as an igniter or the like, for an ignition timing control to be executed.

For instance, the hybrid control means 84 executes the throttle control so as to basically drive the throttle actuator 64 in response to the accelerator opening Acc by referring to the prestored relationship (not shown) such that the greater the accelerator opening Acc, the greater will be the throttle valve opening $\theta_{TH}$. The engine output control device 58 allows the throttle actuator 64 to controllably open or close the electronic throttle valve 62 for throttle control in accordance with the commands delivered from the hybrid control means 84. In addition, the engine output control device 58 causes the fuel injection device to control the fuel injection for fuel injection control while causing the ignition device 68, such as the igniter or the like, to control the ignition timing for ignition timing control, thereby executing the engine torque control The hybrid control means 84 causes the differential portion 11 to perform the electrically controlled CVT function (differential action) to thereby achieve the motor drive running mode, regardless of the engine 8 remaining under a halted condition or an idling state. For instance, the hybrid control means 84 allows the motor drive running mode to be executed in a relatively low output torque range $T_{OUT}$, regarded to be generally lower in engine efficiency than that of the engine operating in a high output torque range. The high output torque range can be otherwise expressed as a low accelerator opening Acc representing a low engine torque Te range or a relatively low vehicle speed range of the vehicle speed V, i.e., a low load range. During the motor drive running mode, the hybrid control means 84 controls the first electric-motor rotation speed $N_{M1}$ in a negative rotation speed so as to suppress a drag of the engine 8 remained under a halted condition for thereby improving fuel consumption. For instance, the hybrid control means 84 allows the first electric motor M1 to be placed in unloaded condition for freely rotating while causing the differential portion 11 to perform the electrically controlled CVT function (differential action) for the engine rotation speed $N_E$ to be maintained at a zeroed or nearly zeroed level depending on needs.

Even if the engine drive running region is present, the hybrid control means 84 allows electric energy generated by the first electric motor M1, and/or electric energy delivered from the battery 56 to be supplied to the second electric motor M2 using the electrical path mentioned above. Thus, the second electric motor M2 is driven to apply torque to the drive wheels 34, providing a so-called torque-assist for assisting the drive power of the engine 8.

The hybrid control means 84 causes the first electric motor M1 to be placed under an unloaded condition to freely rotate in an idling state. Thus, the differential portion 11 is placed in the state in which no torque can be transferred and the power-transmitting path in the differential portion 11 is interrupted. That is, the hybrid control means 84 places the first electric motor M1 in the unloaded condition, making it possible to place the differential portion 11 in a neutral condition (neutral state) in which the power-transmitting path is electrically disconnected.

The hybrid control means 84 has a function to serve as regeneration controlling means. In particular, during a coast running mode with an accelerator pedal being released and a braking mode using a foot brake, the hybrid control means 84 renders the second electric motor M2 operative to serves as the electric power generator driven with kinetic energy of the vehicle i.e. a reverse drive force transmitted from the drive wheels 34 to the engine 8, with a view to improving fuel consumption. The resulting electric energy, i.e. electric power generated by the second electric motor M2, is delivered through the inverter 54 to the battery 56 for the charging thereof. Such regenerative control is effectuated so as to achieve a regeneration amount determined based on the state of charge (SOC) of the battery 56, and a braking force distribution rate of the braking force resulting from the hydraulic brake actuated to obtain the braking force depending and the depressing displacement of the brake pedal.

High speed rotation preventing means 85, playing a role as an essential part of the present invention, has a structure composed of first high-speed rotation preventing means 86 and the second high-speed rotation preventing means 88. The first high-speed rotation preventing means 86 operates to control the output of the engine 8 during a phase of the automatic shifting portion 20 in which a drop occurs in the clutch engaging pressure (supplied hydraulic pressure), supplied to the hydraulically operated friction engagement devices such as the clutch C and the brake B, to a level less than a given value. This prevents respective rotary elements of the differential portion 11 and the automatic shifting portion 20 from increasing in the rotation speed.

The second high-speed rotation preventing means 88 properly controls the first electric motor M1 and the second electric motor M2 when a drop occurs in the clutch engaging pressure (supplied hydraulic pressure) supplied to the hydraulically operated friction engagement devices such as the clutch C and brake B of the automatic shifting portion 20, to a level less than the given value. This prevents respective rotary elements of the differential portion 11 and the automatic shifting portion 20 from increasing in the rotation speed.

In the illustrated embodiment, the first high-speed rotation preventing means 86 corresponds to the claimed first high-speed rotation preventing means by the engine control of the present invention, and the second high-speed rotation preventing means 88 corresponds to the claimed second high-speed rotation preventing means by the electric motor control of the present invention.

The high-speed rotation preventing means 85 is implemented based on vehicle speed determining means 90, accelerator opening determining means 92 and supplied hydraulic pressure determining means 94. The vehicle speed determining means 90 determines whether or not, for instance, the vehicle speed V exceeds a given vehicle speed and. When the vehicle speed V exceeds the given vehicle speed, operation of the high-speed rotation preventing means 85 is effectuated. The given vehicle speed is preliminarily obtained on experiments or theoretically obtained, and determined to an extent not to affect durability of component members forming the rotary elements, even when the drop occurs in the clutch engaging pressure (supplied hydraulic pressure) supplied to the hydraulically operated friction engagement devices of the automatic shifting portion 20. Such drop causes increases in the rotation speeds of the respective rotary elements of both the differential portion 11 and automatic transmission 20.

The given vehicle speed may be varied depending on parameters such as, for instance, the overall speed ratio γT and accelerator opening Acc or shift gear position of the automatic shifting portion 20. In addition, the vehicle speed V is calculated taking a reduction speed ratio of the differential gear device 32 and an effective rotation diameter of each drive wheel 34 into consideration, based on a signal output from a rotation speed sensor (not shown) operative to detect an output-shaft rotation speed $N_{OUT}$ of the output shaft 22 of the automatic shifting portion 20 or a signal output from a rotation speed sensor (not shown) operative to detect the rotation speed of each drive wheel 34.

Besides the determination executed based on the vehicle speed V, a determining condition may be added which is implemented when the vehicle runs under a high load running condition. This prevents the rotary elements of both the differential portion 11 and the automatic shifting portion 20 from rotating at high-speed rotations that would occur due to slippages in the hydraulically operation frictional engaging devices. The slippage is caused in presence of the drop in the supplied hydraulic pressure supplied to the hydraulically operation frictional engaging devices under the high load running condition of the vehicle.

Accelerator opening determining means 92 detects an accelerator opening signal representing the accelerator opening Acc indicative of the displacement of the accelerator pedal 74 being depressed, which is detected with for instance the accelerator opening sensor 72. Then, the operation is executed to determine whether or not the accelerator opening Acc is zeroed, that is, whether or not the accelerator pedal 74 is depressed. If the accelerator opening Acc is zeroed, then the coast running mode or the braking mode is determined, resulting in a non-drive running state under which the rotations are transferred from the drive wheels 34. Under such a non-drive running state, no torque is applied from the engine 8, thereby preventing the rotary elements of both the differential portion 11 and the automatic shifting portion 20 from increasing at high rotation speeds. Thus, the high-speed rotation preventing means 85 is implemented during the drive mode.

The supplied hydraulic pressure determining means 94 determines whether or not the supplied hydraulic pressure (clutch engaging pressure) of the hydraulically operated friction engagement devices of the automatic shifting portion 20 involved in the current gear position (under currently engaged conditions) is lower than a given hydraulic pressure value. The given hydraulic pressure value, obtained on for instance experiments or theoretically obtained, is determined at a hydraulic pressure level to cause slippages to occur in the hydraulically operated friction engagement devices are currently held in engagement. In addition, the given hydraulic pressure value may be varied depending on parameters such as, for instance, the gear position of the automatic shifting portion 20 and accelerator opening Acc.

In the illustrated embodiment, the determination is based on whether or not the drop occurs in the supplied hydraulic pressure based on, for instance, a detected result on the line pressure serving as an original pressure of such a supplied hydraulic pressure. That is, it is not based on direct detection of the supplied hydraulic pressure applied to the respective hydraulically operated friction engagement devices to determine the presence of such a drop. In providing the line pressure, for instance, a regulator valve (not shown) is used to regulate a hydraulic pressure generated by a mechanical oil pump (not shown) incorporated in the automatic shifting portion 20, or a hydraulic pressure boosted by an electric oil pump to thereby lie at a level depending on the accelerator opening Acc. The hydraulic pressure controlling circuit 70, shown in FIG. 5, includes a hydraulic pressure sensor 78 for detecting the line pressure, determines the drop occurrence in the supplied hydraulic pressure applied to the hydraulically operated friction engagement devices, when the detected hydraulic pressure is lower than a given hydraulic value (for example, that required for the normal operation of the electronic controlling device 80). By so doing, no need arises for providing the pressure sensor in the respective hydraulically operated friction engagement devices.

For another determining method of the drop in the supplied hydraulic pressure applied to the hydraulically operated friction engagement devices, the supplied hydraulic pressure determining means 94 can detect a differential rotation speed appearing in the hydraulically operated friction engagement devices kept under engagements. If the differential rotation speed, i.e., a difference in rotation speeds is below a given valve, presence of the drop in the supplied hydraulic pressure is predicted. More particularly, the difference in the rotation speed of the first clutch being engaged in, for instance, respective forward-drive gear positions is detected. The first clutch C1 is disposed between the power-transmitting member 18 and the eighth rotary element RE8, shown in FIG. 1, so that detecting the rotation speeds of the power-transmitting member 18 and the eighth rotary element RE8 enables the difference in the rotation speeds of these component elements to be detected.

For instance, the rotation speed $N_{18}$ of the power-transmitting member 18, equal to the rotation speed $N_{M2}$ of the second electric motor M2, is detected by a resolver detecting the rotation speed $N_{M2}$ of the second electric motor M2. In addition, the rotation speed of the eighth rotary element RE8 is calculated based on the rotation speed $N_{OUT}$ of the output shaft 22 of the automatic shifting portion 20 and a speed ratio of the current gear position of the automatic shifting portion 20. If calculation exhibits a difference in rotation speed between the rotation speed of the power-transmitting member 18 and the rotation speed of the eighth rotary element RE8, the slippage occurrence in the first clutch C1, i.e., a drop occurrence in the supplied hydraulic pressure is predicted. Also, in the reverse-drive gear position where no engagement occurs in the first clutch C1, the determination is made upon detecting the difference in rotation speed of the second clutch C2 in the same method as that described above.

For the other determining method of the drop in the supplied hydraulic pressure of the hydraulically operated frictional engaging device, the supplied hydraulic pressure determining means 94 operates to predict the drop in the supplied hydraulic pressure based on the determination on a failure determining signal output from the mechanical oil pump and the electric oil pump to the electronic control device 80.

Switching controlling means 96 executes switching controls of the first high-speed rotation preventing means 86 and the second and high-speed rotation preventing means 88 based on the determined results of the vehicle speed determining means 90, the accelerator opening determining means 92 and the supplied hydraulic pressure determining means 94. More particularly, the switching controlling means 96 detects the level of the drop in the supplied hydraulic pressure supplied based on the supplied hydraulic pressure determining means 94. Then, the determination is made whether to execute either one of or both of the first high-speed rotation preventing means 86 and the second high-speed rotation preventing means 88, thereby performing the switching controls to execute the relevant high-speed rotation preventing means.

As shown in FIG. 10, for instance, the switching controlling means 96 executes different controls depending on the level of the drop in the supplied hydraulic pressure applied to the hydraulically operated frictional engaging device. In particular, when the pressure drop in the supplied hydraulic pressure lies at a relatively low level (with a minimal level in dropped pressure), the second high-speed rotation preventing means 88 is effectuated for preventing the electric motor from causing the high-speed rotation. When the pressure drop in the supplied hydraulic pressure lies at a relatively high level (with a middle level in dropped pressure), the first high-speed rotation preventing means 86 is effectuated for preventing the engine from causing the high-speed rotation. When the pressure drop in the supplied hydraulic pressure lies at an excessively high level (with a maximal level in dropped pressure), both the first high-speed rotation preventing means 86 and the second high-speed rotation preventing means 88 are effectuated. These execution ranges are preliminarily determined on experiments or theoretically determined in appropriate ranges, and may be varied depending on parameters such as, for instance, the overall speed ratio γT and accelerator opening Acc or gear position of the automatic shifting portion 20.

As set forth above, when the drop occurs in the supplied hydraulic pressure (clutch engaging pressure) supplied to the hydraulically operated frictional engaging device of the automatic shifting portion 20 below a given value, the first high-speed rotation preventing means 86 controls the output of the engine 8 to prevent both the differential portion 11 and automatic shifting portion 20 from reaching the high-speed rotations. More particularly, reducing the output torque input from the engine 8 to the differential portion 11 enables the reduction in torque being input to the automatic shifting portion 20. This decreases torque transferred to the hydraulically operated frictional engaging device which is currently engaged, thereby minimizing or avoiding the slippage occurring in the hydraulically operated frictional engaging device. This results in prevention of the high speed ration of both the rotary element of the automatic shifting portion 20 and the differential portion 11 caused by the slippage.

The engine torque is reduced by a fuel cut-off operation, throttle opening restricting operation or cylinder management operation. Among these, the fuel cut-off operation is executed upon controlling the fuel injection device 66 to shut off fuel being supplied to the engine 8. The throttle opening restricting operation is executed upon controlling the throttle actuator 64 for restricting the throttle opening of the electronic throttle valve 62. In performing the cylinder resting operation, selected ones of the multiple cylinders forming the engine 8 are halted (under cylinder management) in operation.

During the operation to decrease such torque, the first high-speed rotation preventing means 86 outputs a command to the step-variable shifting control means 82 for interrupting the shifting or limiting a specified shifting range. More particularly, the first high-speed rotation preventing means 86 prohibits the operation to execute a downshift that would increase the rotation speeds of the rotary elements of both the differential portion 11 and the input side of the automatic shifting portion 20, while permitting the operation to be executed for an upshift within a range not to affect the high-speed rotation prevention.

As set forth above, when the drop occurs in the supplied hydraulic pressure (clutch engaging pressure) supplied to the hydraulically operated frictional engaging device of the automatic shifting portion 20, below the given value, the second high-speed rotation preventing means 88 controls output torques of the first electric motor M1 and the second electric motor M2. This prevents the rotary elements of both the differential portion 11 and the automatic shifting portion 20 from reaching the high-speed rotations. In particular, the operation is executed to zero, for instance, drive torque output from the first electric motor M1, thereby decreasing torque being input to the automatic shifting portion 20. This results in consequences of minimizing or avoiding the slippage occurring in the hydraulically operated frictional engaging device, thereby preventing the high speed rations of the rotary elements of the automatic shifting portion 20, and the high speed rations of the rotary elements of the differential portion 11 caused by the slippage.

During the operation to decrease such torque, the second high-speed rotation preventing means 88 outputs a command to the step-variable shifting control means 82 for interrupting the shifting or limiting the specified shifting range. More particularly, the second high-speed rotation preventing means 88 interrupts the operation to execute the downshift that would increase the rotation speeds of the rotary elements of the differential portion 11 and input side of the automatic shifting portion 20, while permitting the operation to be executed for the upshift within a range not to affect the operation to prevent the high-speed rotations.

The high-speed rotation preventing means 85 controls the rotation speeds of the first electric motors M1 and the second electric motor M2 to reduce the rotation speed being input to the automatic shifting portion 20. With the rotation speed $N_E$ of the engine 8 maintained at a certain rotation speed, the high-speed rotation preventing means 85 increases the rotation speed $N_{M1}$ of the first electric motor M1. This causes the differential portion 11 to perform a differential action, thereby reducing the rotation speed of the ring gear R1 connected to the second electric motor M2 and power-transmitting member 18. Reducing such a rotation speed of the ring gear R1 allows a reduction in rotation speed of the rotary element of the automatic sifting portion 20 being input through the second electric motor M2 and power-transmitting member 18.

Thus, even if the drop occurs in the supplied hydraulic pressure of the hydraulically operated frictional engaging device, kept under an engaged condition, of the automatic shifting portion 20 with the resultant slippage occurring therein, the high-speed rotation preventing means 85 controls so as to reduce the rotation speed being input to the power-transmitting member 18 (second electric motor M2) and automatic shifting portion 20. Thus, no high-speed rotation is achieved that would causes the rotary elements of the second electric motor M2 and the automatic shifting portion 20 to have degraded durability.

In order to achieve the reduction in the rotation speed of the ring gear R1 (power-transmitting member 18 and second electric motor M2), the rotation speed $N_E$ of the engine 8 may be reduced, and further, the rotation speed $N_{M1}$ of the first electric motor M1 is caused to increase while decreasing the rotation speed $N_E$ of the engine 8, with the rotation speed $N_E$ of the engine 8 maintained at the fixed rotation speed. That is, an appropriate control is performed depending on a running condition of the vehicle within a range available to reduce the ring gear R1 (power-transmitting member 18 and second electric motor M2). This causes a reduction in the rotation speed being input to the automatic shifting portion 20 via the second electric motor M2 connected to the ring gear R1 and power-transmitting member 18. Therefore, even if the drop occurs in the supplied hydraulic pressure of the hydraulically operated frictional engaging device, kept under the engaged condition, of the automatic shifting portion 20 with the resultant slippage occurring therein, no high-speed rotation is achieved that would causes the rotary elements of the second electric motor M2 and automatic shifting portion 20 to have degraded durability.

The rotation speed of the ring gear R1 is controlled to lie at a rotation speed that is preliminarily obtained on experiments or theoretically obtained. More particularly, such a rotation speed represents a rotation speed in which even if the drop occurs in the supplied hydraulic pressure of the hydraulically operated frictional engaging device with a resultant increase in the rotary elements of both the second electric motor M2 and the automatic shifting portion 20, no high rotation speed is accomplished that would cause a deterioration in durability of the rotary elements of the second electric motor M2 and the automatic shifting portion 20. Thus, even controlling the rotation speed of the rotary element of the differential portion 11 prevents the second electric motor M2 and the automatic shifting portion 20 from accomplishing the high-speed rotation.

Figure 11:
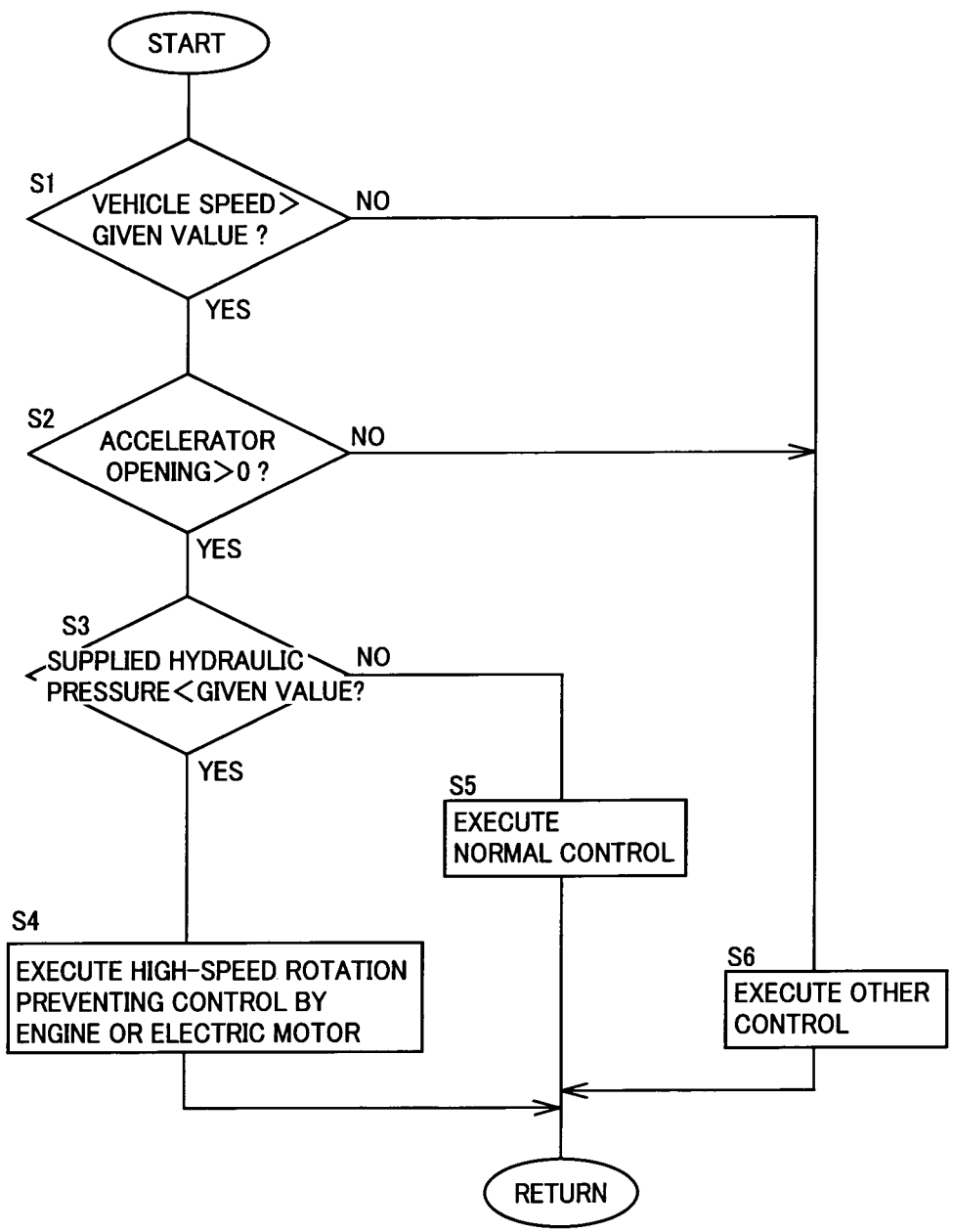
FIG. 11 is a flowchart illustrating a basic sequence of control operations to be executed with the electronic controlling unit shown in FIG. 4, that is a basic sequence of control operations to be executed for preventing high-speed rotations of rotary elements of both a differential portion and an automatic shifting portion.

FIG. 11 is a flowchart illustrating a basic sequence of major control operations to be executed by the electronic controlling unit 80. It is a basic sequence of control operations to be executed for preventing the occurrence of high-speed rotations of the rotary elements of both the differential portion 11 and the automatic shifting portion 20, when the drop occurs in the supplied hydraulic pressure (clutch engaging pressure) of the hydraulically operated frictional engaging device due to some failure or the like, during the engagement thereof. This sequence is repeatedly executed for extremely short cycles each of the order of approximately, for instance, several milliseconds to several tens milliseconds.

First, in step (hereinafter the term "step" will be omitted) S1 corresponding to the vehicle speed determination means 90, whether or not the vehicle speed exceeds a given value is determined. If the determination in S1 is negative, then in S6, the other control such as, for instance, a shifting control of the automatic shifting portion 20 and lockup control or the like is executed to terminate the current routine.

If the determination in S1 is positive, then in S2 corresponding to the accelerator opening determining means 92, whether or not the accelerator opening Acc is zeroed, i.e., whether or not the vehicle state lies in the coast running state is determined. If the determination in S2 is negative, then the determination is made that the coast running state is present with no accelerator pedal 74 being depressed, and in step S6, the other control is executed to terminate the current routine.

If the determination in S2 is positive, then in S3 corresponding to the supplied hydraulic pressure determining means 94, whether or not the supplied hydraulic pressure (clutch engaging pressure) supplied to the hydraulically operated frictional engaging device currently kept under coupling engagement is less than a given value, is determined. If the determination in S3 is negative, then in S5, normal controls are performed including the operation of maintaining the currently shifting state or the operation of executing a shifting control based on the shifting lines.

If the determination in S3 is positive, then the operation proceeds to S4 corresponding to the first high-speed rotation preventing means 86 and the second high-speed rotation preventing means 88, and shifting controlling means 96. In S4, the operations are executed including: (a) an operation to decrease torque being input to the automatic shifting portion 20; or (b) an operation to control the rotation speeds of the engine 8, the first electric motors M1, and the second electric motor M2 for thereby decreasing the input rotation being input to the automatic shifting portion 20, i.e., the rotation speed $N_{18}$ of the power-transmitting member 18. This prevents the rotary elements of both the automatic shifting portion 20 and the differential portion 11 from reaching the high-speed rotations.

The illustrated embodiment has various advantages, which will be described below.

With the illustrated embodiment, first, the first high-speed rotation preventing means 86 and the second high-speed rotation preventing means 88 control the hydraulically operation frictional engaging device such as the clutch C and the brake B of the automatic shifting portion 20. This prevents the rotary elements of both the automatic shifting portion 20 and the differential portion 11 from reaching the high-speed rotations. The same advantage is obtained when lowering of the supplied hydraulic pressure to be less than the given value is predicted. This results in prevention of the drop in durability of the rotary elements of all the differential portion 11, the automatic shifting portion 20 and the second electric motor M2.

Second, operation of the high-speed rotation preventing means 85 is effectuated at a speed higher than a given vehicle speed. That is, in a low vehicle speed region, no operation of the high-speed rotation preventing means 85 is effectuated even if the supplied hydraulic pressure applied to the hydraulically operated frictional engaging device of the automatic shifting portion, is lowered to a level less than the given value. This is because the rotary elements of both the differential portion 11 and the automatic shifting portion 20 have low likelihoods of achieving the high-speed rotations. Thus, operation of the high-speed rotation preventing means 85 is effectuated in an effective fashion.

Third, the first high-speed rotation preventing means 86 is effectuated upon performing the fuel cut-off operation of the engine 8, the throttle opening limiting operation or the cylinder resting operation. This easily enables a reduction in torque output from the engine 8.

Fourth, the second high-speed rotation preventing means 88 is effectuated upon performing the torque controls of the first electric motors M1 and/or the second electric motor M2. This enables torque to be controlled at more immediately than that controlled with the first high-speed rotation preventing means 86 associated with the engine 8.

Fifth, either one of or both of the first high-speed rotation preventing means 86 and the second high-speed rotation preventing means 88 are effectuated depending on the level of the drop in the supplied hydraulic pressure applied to the hydraulically operated frictional engaging device of the automatic shifting portion 20. For instance, when the drop in the supplied hydraulic pressure lies at a relatively low level, only the second high-speed rotation preventing means 88 is effectuated in association with the torque controls of the first and/or second electric motors M1 and M2. On the contrary, if the drop in the supplied hydraulic pressure lies at a remarkably high level, both the first high-speed rotation preventing means 86 and the second high-speed rotation preventing means 88 are effectuated. Thus, the first and second high-speed rotation preventing means 86 and 88 can be applied in an effective manner.

Sixth, during the operation of the high-speed rotation preventing means 85 being effectuated, inhibiting the shifting of the automatic shifting portion 20 or limiting the shifting in the specified shifting range suppresses the high-speed rotations of the rotary elements of both the differential portion 11 and the automatic shifting portion 20 due to the shifting. In particular, during the downshift, the rotary element of the differential portion 11 has a high risk of reaching the high-speed rotation and hence, inhibiting the shifting of the automatic shifting portion 20 is desirable. On the contrary, during the upshift, the rotary element of the differential portion 11 is lowered in the rotation speed, which is not serious as long as the shifting is permitted in a specified shifting range.

Seventh, the drop in the supplied hydraulic pressure applied to the hydraulically operated frictional engaging device of the automatic shifting portion 20 can be easily detected or predicted. This is because the drop in the supplied hydraulic pressure is determined with the hydraulic pressure sensor mounted inside the automatic shifting portion 20, the differential rotation speed of the hydraulically operated frictional engaging device of the automatic shifting portion 20 or the failure determining signal or the like of the hydraulic pressure source.

Eighth, the high-speed rotation preventing means 85 is effectuated under a drive mode of the vehicle. Stated another way, during a non-drive mode of the vehicle under a state such as the coast running of the vehicle, none of the first high-speed rotation preventing means 86 and the second high-speed rotation preventing means 88 are effectuated. This is because the rotations are input from the drive wheels and the rotary elements of both the differential portion 11 and the automatic shifting portion 20 have no risk of reaching the high-speed rotations. Thus, during the non-drive mode of the vehicle, no operation of the high-speed rotation preventing means 85 is effectuated, effectively performing the control.

Ninth, the differential portion 11 and the automatic shifting portion 20 constitute the continuously variable transmission, thereby enabling drive torque to be smoothly varied. The differential portion 11 is able not only to continuously vary the speed ratio to thereby function as the electrically controlled continuously variable transmission, but also to stepwise vary the speed ration to thereby function as the step-variable transmission. Thus, the overall speed ratio of the shifting mechanism 10 can be varied step-by-step, enabling drive torque to be rapidly obtained.

Tenth, the continuously variable transmission can be structured with the differential portion 11 caused to function as for instance the electrically controlled continuously variable transmission, and the automatic shifting portion 20 of the step-variable type. As a result, drive torque can be smoothly varied. In addition, with the differential portion 11 controlled to allow the speed ratio to lie at the fixed value, the differential portion 11 and the automatic shifting portion 20 establish the same state as the step-variable transmission. This causes the overall speed ratio of the shifting mechanism 10 to vary stepwise, enabling drive torque to be rapidly obtained.

While the present invention has been described above in detail with reference to the illustrated embodiment shown in the accompanying drawings, the present invention may be implemented in other modes.

In the illustrated embodiment, for instance, the supplied hydraulic pressure determining means 94 is enabled to detect the pressure drop in the line pressure acting as the original hydraulic pressure supplied to, for instance, the hydraulically operated frictional engaging devices. Thus, the pressure drop in the supplied hydraulic pressure of the hydraulically operated frictional engaging devices is determined. However, the present invention is not limited to the line pressure. In an alternative, pressure sensors may be provided in the respective hydraulically operated frictional engaging devices to directly detect supplied hydraulic pressures of the hydraulically operated frictional engaging devices, respectively, for determining the pressure drops in the respective hydraulically operated frictional engaging devices.

In the illustrated embodiment, the first and second high-speed rotation preventing means 86 and 88 prevent the rotation speeds of both the automatic shifting portion 20 and the differential portion 11 from reaching the high-speed rotations. However, the operation may be executed not to necessarily prevent the high-speed rotations of the automatic shifting portion 20 and the differential portion 11 on a stage immediately after the drop occurs in the supplied hydraulic pressure, but to immediately decrease the rotation speed subsequent to the consequence of reaching the high-speed rotation.

In the illustrated embodiment, the second electric motor M2 is directly connected to the power-transmitting member 18. However, the present invention is not limited to such a connecting position of the second electric motor M2. In an alternative, the power-transmitting member 18 may be directly connected to the power-transmitting path between the differential portion 11 and the drive wheels 34, or may be indirectly connected to the power-transmitting path via a transmission or the like.

In the illustrated embodiment, the differential portion 11 is configured to function as the electrically controlled continuously variable transmission in which the speed ratio $\gamma 0$ is continuously varied from the minimal value $\gamma 0_{min}$ to the maximal value $\gamma 0_{max}$. However, the present invention may be applied even to a case wherein, for instance, the speed ratio $\gamma 0$ of the differential portion 11 is not continuously varied but is varied step-by-step with the use of a differential action.

In the illustrated embodiment, moreover, the differential portion 11 may include a differential action limiting device incorporated in the power distributing mechanism 16 for limiting a differential action to be operative as at least a forward two-stage step-variable transmission.

In the power distribution mechanisms 16 of the illustrated embodiments, the first carrier CA1 is connected to the engine 8; the first sun gear S1 is connected to the first electric motor M1; and the first ring gear R1 is connected to the power-transmitting member 18. However, the present invention is not necessarily limited to such connecting arrangement. In an alternative, the engine 8, the first electric motor M1 and the power-transmitting member 18 may be connected to either one of the three elements CA1, S1 and R1 of the first planetary gear set 24.

In the illustrated embodiment, the engine 8 is directly connected to the input shaft 14. However, these component parts may suffice to be operatively connected via, for instance, gears, belts or the like. No need arises for these component parts to be disposed on a common axis.

In the illustrated embodiment, the first electric motors M1 the second electric motor M2 are coaxially disposed with the input shaft 14 such that the first electric motor M1 is connected to the first sun gear S1 and the second electric motor M2 is connected to the power-transmitting member 18. However, such a connecting arrangement of the component parts is not necessarily needed. For example, the first electric motor M1 may be operatively connected to the first sun gear S1 through gears, a belt or the like, and the second electric motor M2 may be connected to the power-transmitting member 18.

In the illustrated embodiment, the automatic shifting portion 20 is connected to the differential portion 11 in series via the power-transmitting member 18. However, a countershaft may be provided in parallel to the input shaft 14 to allow the automatic shifting portion 20 to be disposed on the countershaft in a concentric relationship. In this case, the differential portion 11 and the automatic shifting portion 20 may be connected to each other in power-transmitting capability via a set of transmitting members structured of, for instance, a counter-gear pair acting as the power-transmitting member 18, a sprocket and a chain.

In the illustrated embodiment, the power distributing mechanism 16 may include, for instance, a differential gear set in which a pinion rotatably driven with the engine, and a pair of bevel gears held in meshing engagement with the pinion, are operatively connected to the first electric motor M1 and the power-transmitting member 18 (second electric motor M2).

In the illustrated embodiment, the power distributing mechanism 16 is comprised of one set of planetary gear units. However, the power distributing mechanism 16 may include two or more sets of planetary gear units which are arranged to function as the transmission having three or more speed positions under the non-differential state (fixed shifting state). In addition, the planetary gear unit is not limited to the single-pinion type, but may be of a double-pinion type.

Even under a circumstance where the power distributing mechanism 16 is comprised of the two or more sets of planetary gear units, the engine 8, the first and second electric motors M1 and M2, the power-transmitting member 18 and the output shaft 22, depending on a structure, may be connected to the rotary elements of these planetary gear units for power-transmitting capability in structure. Controlling the clutch C and the brake B connected to the rotary elements of the planetary gear units allows the switching to be initiated between the step-variable shifting and the continuously variable shifting.

In the illustrated embodiment, the engine 8 and the differential portion 11 are directly connected to each other. However, these component parts may not be necessarily connected to each other and the engine 8 and the differential portion 11 may be connected to each other via the clutch.

In the illustrated embodiment, the differential portion 11 and automatic shifting portion 20 take the form of a structure in which these component parts are connected to each other in series. However, the present invention is not limited to such a structure and both the component parts may not need to be mechanically independent from each other. That is, the present invention can be applied provided that a structure has a function of the whole shifting mechanism 10, and a function of the whole shifting mechanism 10 permitting a shifting to be performed on a principle different from the shifting caused by an electrically controlled differential action. The present invention is not particularly limited to positional layouts and layout sequences of the differential portion 11 and automatic shifting portion 20.

While the shift operating device 50 of the illustrated embodiment has been described with reference to the shift lever 52 operative to select a plurality of kinds of shift positions $P_{SH}$, the shift lever 52 may be replaced by other type of switches or devices. These may include, for instance: a select switch such as a press-button type switch and a slide-type switch available to select one of a plurality of shift positions $P_{SH}$; or a device operative to select one of a plurality of shift positions $P_{SH}$ in response not to a manual operation but to a driver's voice and a device operative to select one of a plurality of shift positions $P_{SH}$ in response to the manipulation initiated by the foot.

The shift lever 52 is of the type in which the shifting range is determined when shifted to the "M" position. However, the gear positions may be set, i.e., maximal speed gear positions for respective shifting ranges may be set as the gear positions. In this case, the automatic shifting portion 20 operates so as to allow the gear positions to be switched for executing the shifting action. For example, as the shift lever 52 is manually operated to an upshift position "+" or downshift position "−" in the "M" position, the automatic shifting portion 20 operates so as to allow any of the 1st-speed gear position to the 4th-speed gear position to be set depending on the shift lever 52 being manipulated.

The foregoing merely illustrates the embodiment for illustrating one embodiment of the present invention. It will be appreciated by those skilled in the art that various modifications and alternatives to those details could be developed in the light of the overall teachings of the disclosure.

The invention claimed is:

1. A control device for a vehicular drive system having (i) an engine, (ii) an electrically controlled differential portion including a first plurality of rotary elements and being operative to control a differential state between a rotation speed of an input shaft connected to the engine, and a rotation speed of an output shaft by controlling an operating state of an electric motor connected to one of the first plurality of rotary elements that is part of a differential mechanism for power-transmissive state, and (iii) a shifting portion including a second plurality of rotary elements and forming a part of a power-transmitting mechanism between the electrically controlled differential portion and drive wheels, the control device comprising a high-speed rotation preventing portion configured to prevent high-speed rotations of each of the first and second pluralities of rotary elements, when a drop occurs or drop occurrence is predicted, in a supplied hydraulic pressure applied to a hydraulically operated frictional engaging device of the shifting portion, to a level less than a given value, wherein the high-speed rotation preventing portion reduces torque or rotation speed of an input shaft of the shifting portion by controlling the engine or the electric motor, (i) the high-speed rotation preventing portion includes a first high-speed rotation preventing portion associated with an engine control and configured to prevent the high-speed rotations of the first and second pluralities of rotary elements by reducing the torque of the input shaft of the shifting portion by controlling the engine, and a second high-speed rotation preventing portion associated with an electric motor control and configured to prevent the high-speed rotations of the first and second pluralities of rotary elements by reducing the torque of the input shaft of the shifting portion by controlling the electric motor, and (ii) the high-speed rotation preventing portion effectuates either one of or both of the first high-speed rotation preventing portion and the second high-speed rotation preventing portion, associated with the engine control and the electric motor control, respectively, depending on the level in the supplied hydraulic pressure applied to the hydraulically operated frictional engaging device, an execution range to effectuate the first high-speed rotation preventing portion, an execution range to effectuate the second high-speed rotation preventing portion, and an execution range to effectuate both the first high-speed rotation preventing portion and the second high-speed rotation preventing portion are set depending on the supplied hydraulic pressure, the supplied hydraulic pressure in the execution range to effectuate the second-high rotation preventing portion is higher than the supplied hydraulic pressure in the execution range to effectuate the first high-speed rotation preventing portion, and the supplied hydraulic pressure in the execution range to effectuate the first high-speed rotation preventing portion is higher than the supplied hydraulic pressure in the execution range to effectuate both the first high-speed rotation preventing portion and the second high-speed rotation preventing portion.

2. The control device for a vehicular drive system according to claim 1, wherein the first high-speed rotation preventing portion or the second high-speed rotation preventing portion is effectuated at a speed greater than a given vehicle speed.

3. The control device for a vehicular drive system according to claim 1, wherein the first high-speed rotation preventing portion effectuates a fuel cut-off operation of the engine, a throttle opening limiting operation or a cylinder resting operation.

4. The control device for a vehicular drive system according to claim 1, wherein the second high-speed rotation preventing portion associated with the electric motor control, is effectuated upon executing a torque control of the electric motor.

5. The control device for a vehicular drive system according to claim 1, wherein during effectuating the high-speed rotation preventing portion, a shifting of the shifting portion is inhibited or limited to fall in a specified shifting range.

6. The control device for a vehicular drive system according to claim 1, wherein a drop in the supplied hydraulic pressure applied to the hydraulically operated frictional engaging device, is determined in response to a signal delivered from a hydraulic pressure sensor disposed in the shifting portion, a differential rotation speed of the hydraulically operated frictional engaging device or a failure determining signal delivered from a hydraulic pressure source.

7. The control device for a vehicular drive system according to claim 1, wherein the high-speed rotation preventing portion is effectuated during a drive mode of a vehicle.

8. The control device for a vehicular drive system according to claim 1, wherein the electrically controlled differential portion is operable as a continuously variable transmission mechanism with the operating state of the electric motor being controlled.

9. The control device for a vehicular drive system according to claim 1, wherein the shifting portion includes a step-variable type automatic transmission.

* * * * *